US007170508B2

(12) United States Patent
Ohno et al.

(10) Patent No.: US 7,170,508 B2
(45) Date of Patent: Jan. 30, 2007

(54) CHARACTER DISPLAY METHOD IN THREE-DIMENSIONAL VIDEO GAME

(75) Inventors: Koji Ohno, Tokyo (JP); Yoshiyuki Miyagawa, Tokyo (JP)

(73) Assignee: Kabushiki Kaisha Square Enix, Tokyo (JP)

( * ) Notice: Subject to any disclaimer, the term of this patent is extended or adjusted under 35 U.S.C. 154(b) by 410 days.

(21) Appl. No.: 10/293,360

(22) Filed: Nov. 14, 2002

(65) Prior Publication Data

US 2003/0096648 A1 May 22, 2003

(30) Foreign Application Priority Data

Nov. 15, 2001 (JP) ............................. 2001-350484

(51) Int. Cl.
*G06T 15/00* (2006.01)
(52) U.S. Cl. .................. 345/419; 345/427; 345/441; 345/473; 463/4; 463/6; 463/16; 463/32; 463/22
(58) Field of Classification Search ................ 345/473, 345/441, 427, 419; 463/4, 6, 16, 32, 33
See application file for complete search history.

(56) References Cited

U.S. PATENT DOCUMENTS

| | | | | |
|---|---|---|---|---|
| 5,986,674 | A | * | 11/1999 | Yamato ...................... 345/441 |
| 6,126,545 | A | | 10/2000 | Takahashi et al. |
| 6,139,434 | A | | 10/2000 | Miyamoto et al. |
| 6,304,267 | B1 | * | 10/2001 | Sata ........................... 345/427 |
| 6,354,944 | B1 | | 3/2002 | Takahashi et al. |
| 6,409,597 | B1 | | 6/2002 | Mizumoto |

FOREIGN PATENT DOCUMENTS

| | | |
|---|---|---|
| EP | 0841640 | 5/1998 |
| EP | 0933105 | 8/1999 |
| JP | 8-131656 | 5/1996 |
| JP | 9-212686 | 1/1997 |
| JP | 11-4963 | 1/1999 |
| JP | 11007543 | 1/1999 |
| JP | 11007547 | 1/1999 |
| JP | 11-137842 | 5/1999 |

OTHER PUBLICATIONS

English Language Abstract of JP 8-131565.
English language Abstract of JP 11-137842.
English language Abstract of JP 9-212686.
English Language Abstract for JP Appln. No. 11-007543.
English Language Abstract for JP Appln. No. 11-007547.

* cited by examiner

*Primary Examiner*—Kimbinh T. Nguyen
(74) *Attorney, Agent, or Firm*—Greenblum & Bernstein, P.L.C.

(57) ABSTRACT

When a player instructs a movement of a player character from an input device, a control section obtains a position of the player character during a current frame period. The control section obtains a distance between the position of the player character during the current period and a position of a view point of a virtual camera during a previous frame period. If the obtained distance is less than a predetermined critical near distance, the control section moves the position of the view point away from the player character. If the obtained distance exceeds a critical far distance, the control section moves the position of the view point towards the player character. If the obtained distance is in the range between the critical near distance and the critical far distance, the control section does not move the position of the view point.

41 Claims, 12 Drawing Sheets

$D >$ SECOND DISTANCE

FIRST DISTANCE $\leqq D \leqq$ SECOND DISTANCE $D <$ FIRST DISTANCE $$(X_{fe}, Y_{fe}, Z_{fe}) = (X_e, Y_e, Z_e) - m(X_c - X_e, Y_c - Y_e, Z_c - Z_e)$$

$$(X_{ne}, Y_{ne}, Z_{ne}) = (X_e, Y_e, Z_e) + n(X_c - X_e, Y_c - Y_e, Z_c - Z_e)$$

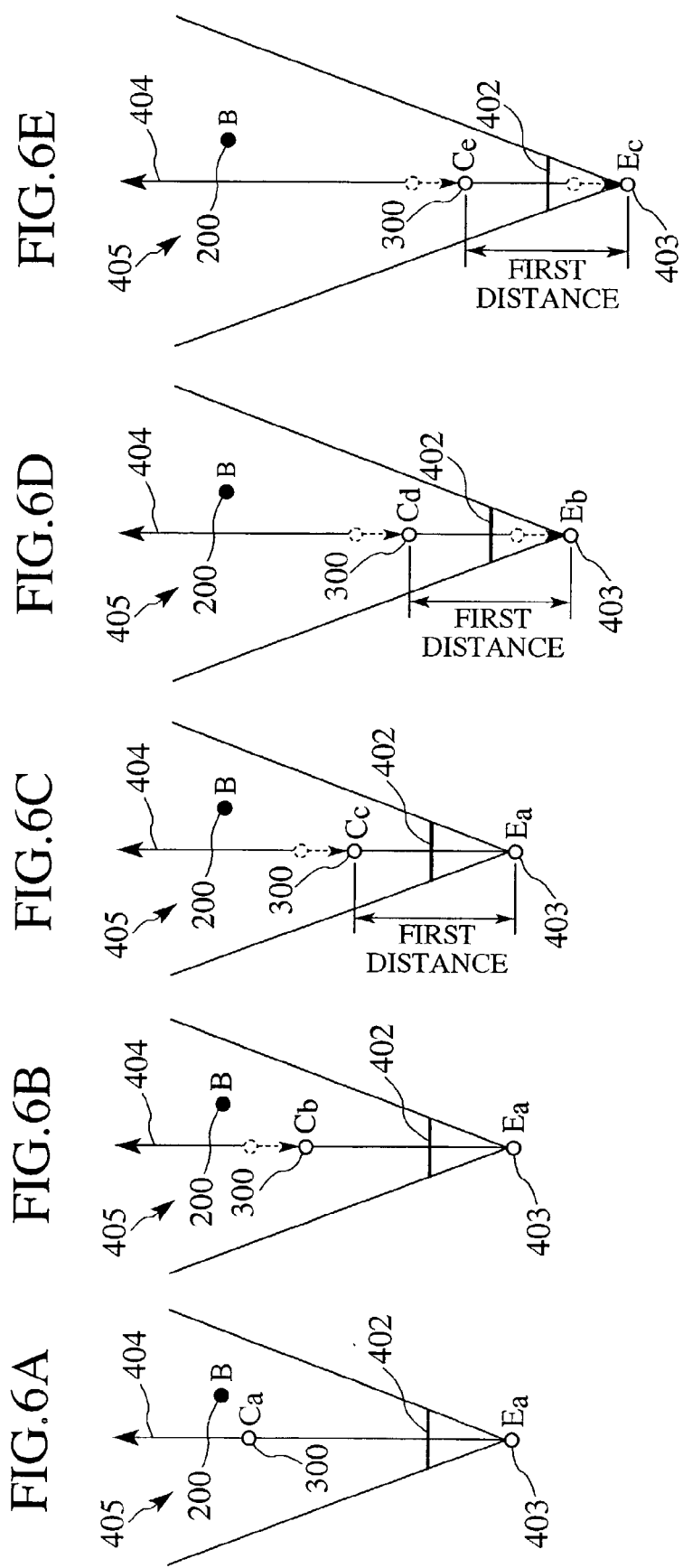

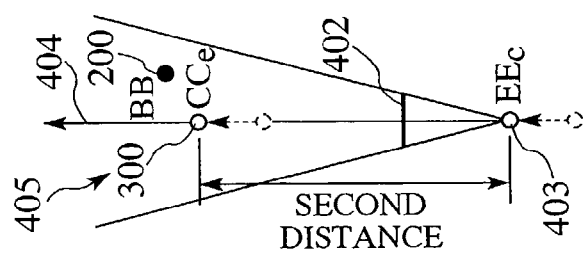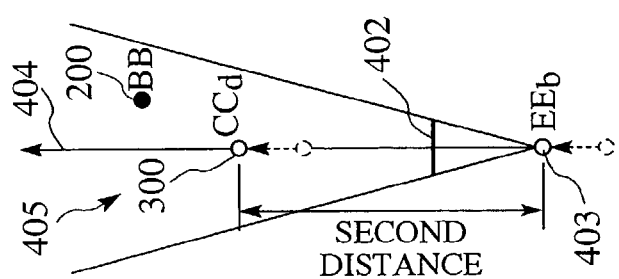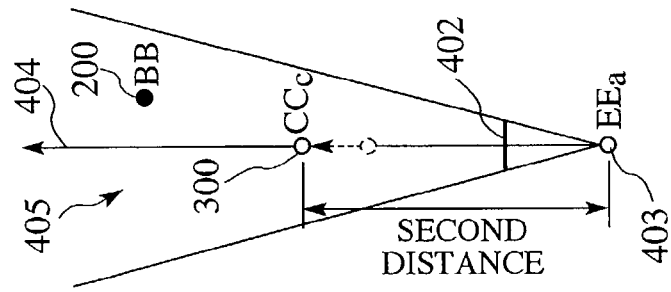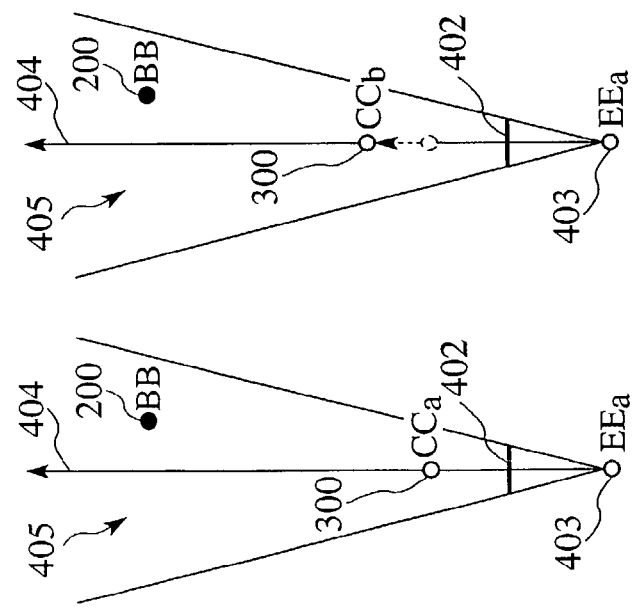

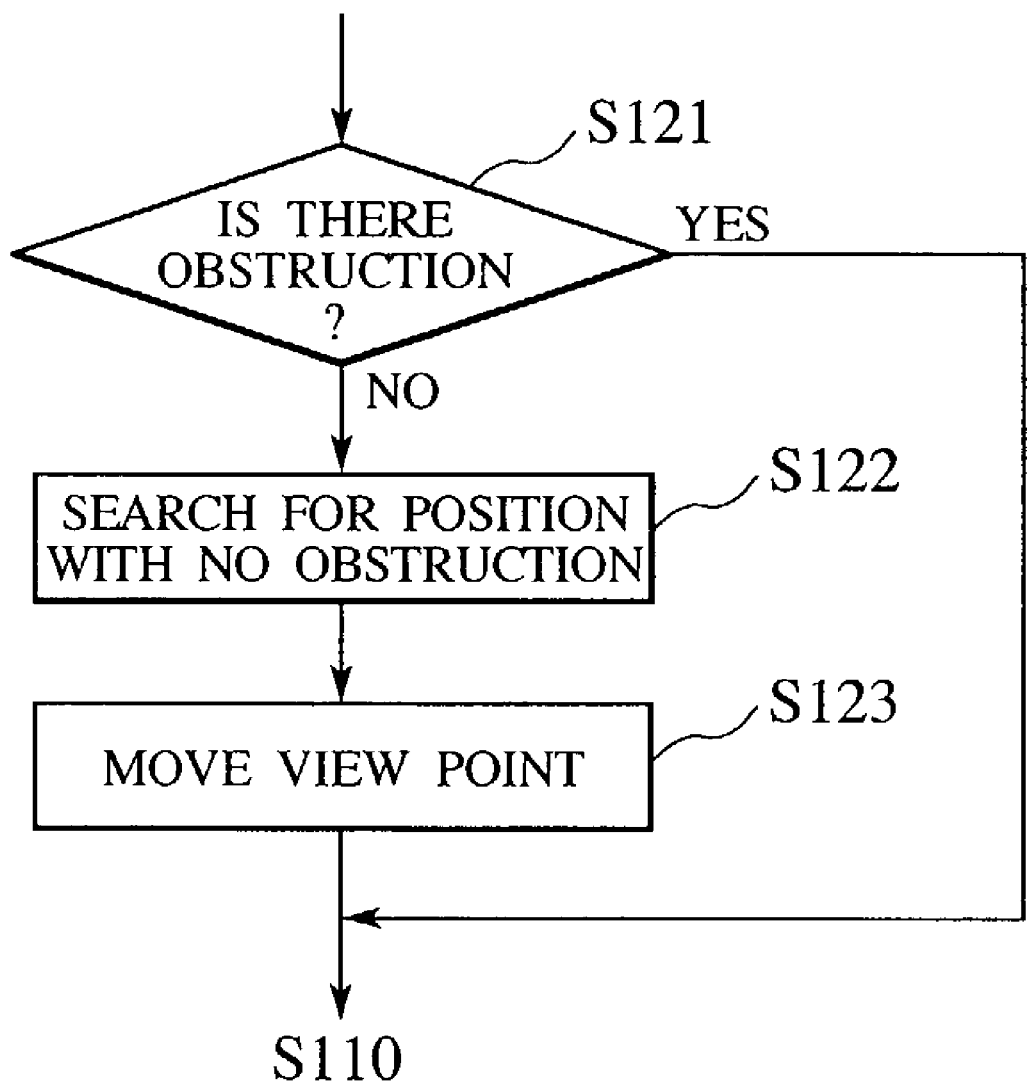

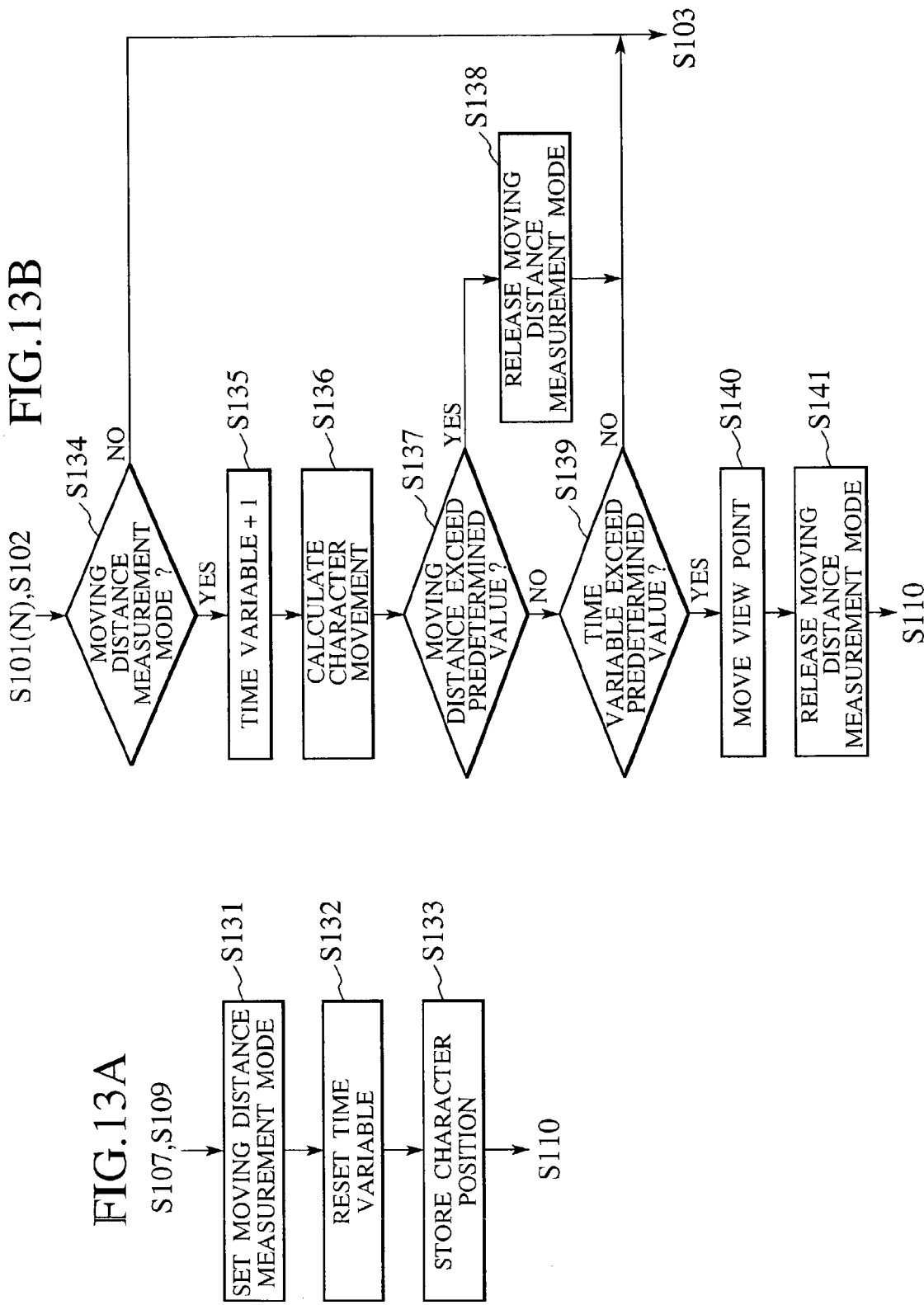

CHARACTER DISPLAY METHOD IN THREE-DIMENSIONAL VIDEO GAME

CROSS REFERENCE TO RELATED APPLICATION

The present disclosure relates to subject matter contained in Japanese Patent Application No. 2001-350484, filed on Nov. 15, 2001, the disclosure of which expressly incorporated herein by reference in its entirety.

BACKGROUND OF THE INVENTION

1. Field of the Invention

The present invention relates to a method for displaying a character that moves in a virtual three-dimensional space in a three-dimensional video game.

2. Description of the Related Art

In the three-dimensional video game, a player character, which operates according to an instruction sent from a game player, moves in the virtual three-dimensional space. Perspective transformation is performed on the virtual three-dimensional space including the player character from a predetermined position (a view point of a virtual camera) onto a virtual screen. An image indicating the state that the player character moves is displayed on a display device.

Movement of the player character is the most important element for the progress of the game. Accordingly, in order to display the player character to be easily understandable for the player, it is necessary to move the position of the view point in accordance with movement of the player character. A conventional video game that moves the position of the view point in accordance with movement of the player character, moves the position of the view point to maintain a fixed interval between the position of the player character and that of the view point.

However, if the distance between the position of the player character and that of the view point is always kept constant, the size of the player character in an image displayed on the display device is not changed at all. For example, in the case where a field having few landmarks such as a desert is formed in the virtual three-dimensional space, an image to be displayed is changed only slightly even if the player character moves in the field area. As a result, the player cannot clearly recognize the fact that the player character moves from the image formed on the display screen. In this method, the position of the view point must be determined for each frame, increasing an amount of processing.

In contrast to this, there is a video game that performs perspective transformation after fixing the position of the view point completely. In this case, if the player character moves, the size of the character to be displayed is changed. In the case of a game such as a battle game having a narrow space where the player character is movable, no major problem is caused even if the aforementioned method is used. However, in the case of a game such as a role playing game having an extremely wide space where the player character is movable, there is a case that the position of the player character is so close to the view point that the field cannot be displayed on the display screen, or a case that the position of the player character is so far from the view point that the size of the player character to be displayed is reduced, with the result that the player character is barely seen.

Unexamined Japanese Patent Publication Nos. 11-4963 and 11-7543 disclose techniques that first and second displayed objects exist in a virtual space and a view point of a virtual camera is moved or an angle of view thereof is changed based on the positional relationship between the first and second displayed objects.

However, there are many video games that progress a game even if two displayed objects do not exist unlike the cases described in the aforementioned publications. For example, there is a video game such as a role playing game in which the player character moves on a field formed in the virtual three-dimensional space. The techniques described in the above two publications cannot be applied to such a video game.

SUMMARY OF THE INVENTION

An object of the present invention is to provide a video game apparatus and the like that allow a player to effectively recognize movement of a character that moves in a virtual three-dimensional space in a three-dimensional video game.

A video game apparatus according to a first aspect of the present invention is a video game apparatus, which moves a character in a virtual three-dimensional space and performs perspective transformation on the character from a view point of a virtual camera onto a virtual screen. This video game apparatus includes a distance calculator that calculates a distance between a position in the virtual three-dimensional space of the character and a position of the view point of the virtual camera; and a far distance determining section that determines whether or not the distance calculated by the distance calculator is longer than a predetermined critical far distance. The apparatus further includes a view point mover that moves the position of the view point closer to the character when the far distance determining section determines that the distance is longer than the critical far distance. The apparatus further includes a perspective transformation system that performs perspective transformation on the character in the virtual three-dimensional space from the view point of the virtual camera onto the virtual screen. When the view point mover moves the position of the view point, the character is subjected to perspective transformation from the moved view point onto the virtual screen to generate an image to be displayed on the display screen.

This video game apparatus may further include a near distance determining section that determines whether the distance calculated by the distance calculator is shorter than a predetermined critical near distance which is shorter than the critical far distance. In this case, the view point mover can move the position of the view point away from the character when the near distance determining section determines that the calculated distance is shorter than the critical near distance.

Another video game apparatus according to the first aspect of the present invention is a video game apparatus, which moves a character in a virtual three-dimensional space and performs perspective transformation on the character from a view point of a virtual camera onto a virtual screen. This video game apparatus includes a distance calculator that calculates a distance between a position in the virtual three-dimensional space of the character and a position of the view point of the virtual camera. The apparatus further includes a near distance determining section that determines whether the distance calculated by the distance calculator is shorter than a predetermined critical near distance. The apparatus further includes a view point mover that moves the position of the view point away from the character when the near distance determining section determines that the calculated distance is shorter than the critical near distance. The apparatus further includes a perspective transformation system that performs perspective transformation on the character in the virtual three-dimensional space from the view point of the virtual camera onto the virtual screen. When the view point mover moves the position of the view point, the character is subjected to perspective transformation from the moved view point onto the virtual screen to generate an image to be displayed on the display screen.

The video game apparatuses according to the first aspect perform perspective transformation without moving the view point of the virtual camera if the distance between the position of the character and the position of the view point is the critical far distance or less and/or the critical near distance or greater. Since the distance between the character and the view point is changed by moving the position of the character, the size of the character, which is subjected to perspective transformation and is displayed on the display screen, is changed. The change in the size of the character allows the player to easily recognize that the character moves in the virtual three-dimensional space.

In the case where the distance between the position of the character and the position of the view point is farther than the critical far distance and/or nearer than the critical near distance, the position of the view point moves in accordance with movement of the character. This results in an appropriate size of the character displayed on the display screen. In the case where the distance between the position of the character and the position of the view point is the critical far distance or less and/or the critical near distance or greater, the view point does not have to be moved, with the result that the amount of processing can be reduced.

A video game apparatus according to a second aspect of the present invention is a video game apparatus, which moves a character in a virtual three-dimensional space and performs perspective transformation on the character from a view point of a virtual camera onto a virtual screen. This video game apparatus includes a distance calculator that calculates a distance between a position in the virtual three-dimensional space of the character and a position of the view point of the virtual camera. The apparatus further includes a far distance determining section that determines whether the distance calculated by the distance calculator is longer than a predetermined critical far distance. The apparatus further includes a field of view changer that decreases a range of the field of view of the virtual camera when the far distance determining section determines that the calculated distance is longer than the critical far distance. The apparatus further includes a perspective transformation system that performs perspective transformation on the character in the virtual three-dimensional space from the view point of the virtual camera onto the virtual screen. When the view point changer changes the range of the field of view, the character is subjected to perspective transformation onto the virtual screen with the range of the changed field of view to generate an image to be displayed on the display screen.

This video game apparatus may further include a near distance determining section that determines whether the distance calculated by the distance calculator is shorter than a predetermined critical near distance, which is shorter than the critical far distance. In this case, the field of view changer can increase the range of the field of view of the virtual camera when the near distance determining section determines that the calculated distance is shorter than the critical near distance.

Another video game apparatus according to the second aspect of the present invention is a video game apparatus, which moves a character in a virtual three-dimensional space and performs perspective transformation on the character from a view point of a virtual camera onto a virtual screen. This video game apparatus includes a distance calculator that calculates a distance between a position in the virtual three-dimensional space of the character and a position of the view point of the virtual camera. The apparatus further includes a near distance determining section that determines whether the distance calculated by the distance calculator is shorter than a predetermined critical near distance. The apparatus further includes a field of view changer that increases a range of the field of view of the virtual camera when the near distance determining section determines that the calculated distance is shorter than the critical near distance. The apparatus further includes a perspective transformation system that performs perspective transformation on the character in the virtual three-dimensional space from the view point of the virtual camera onto the virtual screen. When the view point changer changes the range of the field of view, the character is subjected to perspective transformation onto the virtual screen with the range of the changed field of view to generate an image to be displayed on the display screen.

The video game apparatuses according to the second aspect perform perspective transformation without changing the range of the field of view of the virtual camera if the distance between the position of the character and the position of the view point is the critical far distance or less and/or the critical near distance or greater. The size of the character, which is subjected to perspective transformation and is displayed on the display screen, is changed by moving the position of the character. The change in the size of the character allows the player to easily recognize that the character moves in the virtual three-dimensional space.

In the case where the distance between the position of the character and the position of the view point is farther than the critical far distance and/or nearer than the critical near distance, the range of the field of view changes in accordance with movement of the character. This results in an appropriate size of the character displayed on the display screen. In the case where the distance between the position of the character and the position of the view point is the critical far distance or less and/or the critical near distance or greater, the range of the field of view does not have to be changed, with the result that the amount of processing can be reduced.

A video game apparatus according to a third aspect of the present invention is a video game apparatus having a memory that stores a three-dimensional video game program and a processor that executes the program and causing a display device to display an image as a result of processing executed by the processor. The program stored in the memory of this video game apparatus and executed by the processor includes moving a character in a virtual three-dimensional space. The program further includes calculating a distance between a position of the character in the virtual three-dimensional space and a position of a view point of a virtual camera. The program further includes determining whether the calculated distance is longer than a predetermined critical far distance. The program further includes moving the position of the view point closer to the character when it is determined that the distance is longer than the critical far distance. The program further includes performing perspective transformation on the character in the virtual three-dimensional space from the view point of the virtual camera onto a virtual screen.

Another video game apparatus according to the third aspect of the present invention is a video game apparatus having a memory that stores a three-dimensional video game program and a processor that executes the program and causing a display device to display an image as a result of processing executed by the processor. The program stored in the memory of this video game apparatus and executed by the processor includes moving a character in a virtual three-dimensional space. The program further includes calculating a distance between a position of the character in the virtual three-dimensional space and a position of a view point of a virtual camera. The program further includes determining whether the calculated distance is shorter than a predetermined critical near distance. The program further includes moving the position of the view point away from the character when it is determined that the calculated distance is shorter than the critical near distance. The program further includes performing perspective transformation on the character in the virtual three-dimensional space from the view point of the virtual camera onto a virtual screen.

A video game apparatus according to a fourth aspect of the present invention is a video game apparatus having a memory that stores a three-dimensional video game program and a processor that executes the program and causing a display device to display an image as a result of processing executed by the processor. The program stored in the memory of this video game apparatus and executed by the processor includes moving a character in a virtual three-dimensional space. The program further includes calculating a distance between a position of the character in the virtual three-dimensional space and a position of a view point of a virtual camera. The program further includes determining whether the calculated distance is longer than a predetermined critical far distance. The program further includes decreasing a range of the field of view of the virtual camera when it is determined that the calculated distance is longer than the critical far distance. The program further includes performing perspective transformation on the character in the virtual three-dimensional space from the view point of the virtual camera onto a virtual screen.

Another video game apparatus according to the fourth aspect of the present invention is a video game apparatus having a memory that stores a three-dimensional video game program and a processor that executes the program and causing a display device to display an image as a result of processing executed by the processor. The program stored in the memory of this video game apparatus and executed by the processor includes moving a character in a virtual three-dimensional space. The program further includes calculating a distance between a position of the character moved in the virtual three-dimensional space and a position of a view point of a virtual camera. The program further includes determining whether the calculated distance is shorter than a predetermined critical near distance. The program further includes increasing a range of the field of view of the virtual camera when it is determined that the distance is shorter than the critical near distance. The program further includes performing perspective transformation on the character in the virtual three-dimensional space from the view point of the virtual camera onto a virtual screen.

A character display method in a three-dimensional video game according to a fifth aspect of the present invention moves a character in a virtual three-dimensional space and performs perspective transformation on the character from a view point of a virtual camera onto a virtual screen to display on a display screen. This character display method includes calculating a distance between a position of the character in the virtual three-dimensional space and a position of the view point of the virtual camera. The method further includes determining whether the calculated distance is longer than a predetermined critical far distance. The method further includes moving the position of the view point closer to the character when it is determined that the calculated distance is longer than the critical far distance.

This character display method further includes determining whether the calculated distance is shorter than a predetermined critical near distance, which is shorter than the critical far distance. The method further includes moving the position of the view point away from the character when it is determined that the calculated distance is shorter than the critical near distance.

Another character display method in a three-dimensional video game according to the fifth aspect of the present invention moves a character in a virtual three-dimensional space and performs perspective transformation on the character from a view point of a virtual camera onto a virtual screen to display on a display screen. This character display method includes calculating a distance between a position of the character in the virtual three-dimensional space and a position of the view point of the virtual camera. The method further includes determining whether the calculated distance is shorter than a predetermined critical near distance. The method further includes moving the position of the view point away from the character when it is determined that the calculated distance is shorter than the critical near distance.

A character display method in a three-dimensional video game according to a sixth aspect of the present invention moves a character in a virtual three-dimensional space and performs perspective transformation on the character from a view point of a virtual camera onto a virtual screen to display on a display screen. This character display method includes calculating a distance between a position of the character in the virtual three-dimensional space and a position of the view point of the virtual camera. The method further includes determining whether the calculated distance is longer than a predetermined critical far distance. The method further includes decreasing a range of the field of view of the virtual camera when it is determined that the calculated distance is longer than the critical far distance.

Another character display method in a three-dimensional video game according to the sixth aspect of the present invention moves a character in a virtual three-dimensional space and performs perspective transformation on the character from a view point of a virtual camera onto a virtual screen to display on a display screen. This character display method includes calculating a distance between a position of the character in the virtual three-dimensional space and a position of the view point of the virtual camera. The method further includes determining whether the calculated distance is shorter than a predetermined critical near distance. The method further includes increasing a range of the field of view of the virtual camera when it is determined that the calculated distance is shorter than the critical near distance.

The video game apparatuses according to the first to sixth aspects can use a general-purpose computer such a personal computer, etc., in addition to the video game dedicated apparatus. The video game apparatuses according to the first to fourth aspects can use other electronic equipment capable of operating as a computer apparatus such as a cellular phone, etc. It is assumed that these apparatuses can be used regardless of whether they are portable or stationary types.

The three-dimensional video game program stored in the memory in the video game apparatuses according to the third and fourth aspects can be provided as being recording on a computer-readable storage medium. This computer-readable storage medium may be a storage medium, which is structured to be attachable and detachable to and from the computer apparatus to be provided separately from the computer apparatus. This computer-readable storage medium may be a storage medium such as a fixed disk apparatus, which is provided in the computer apparatus and provided together with the computer apparatus. The three-dimensional video game program stored in the memory in the video game apparatus according to the third and fourth aspects can be distributed via a network from a server apparatus existing on the network after superimposing the data signal of the program on a carrier wave.

BRIEF DESCRIPTION OF THE DRAWINGS

FIGS. 6A to 6E are views each illustrating the relationship between the position of the player character and that of the view point when the player character advances in a direction of the view point;

FIGS. 8A to 8E are views each illustrating the relationship between the position of the player character and that of the view point when the player character advances in a direction opposite to the view point;

FIG. 12 is a flowchart showing processing of a first modification added to the processing of FIG. 5; and FIGS. 13A and 13B are flowcharts showing processing of a second modification added to the processing of FIG. 5.

DETAILED DESCRIPTION OF PREFERRED EMBODIMENTS

Embodiment of the present invention will be specifically explained with reference to the drawings.

Figure 1:
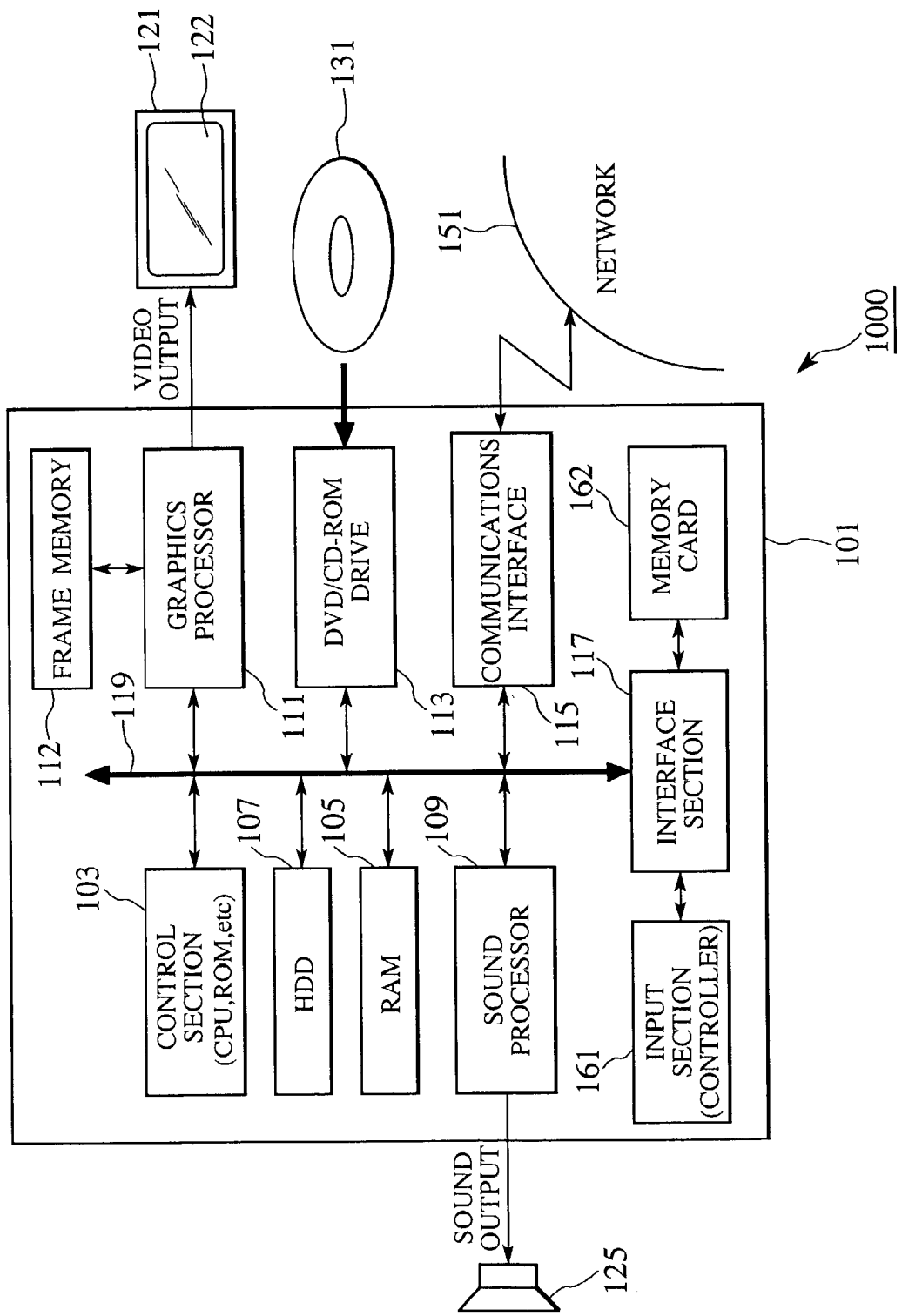
FIG. 1 is a block diagram illustrating a configuration of a computer for executing a video game according to one embodiment of the present invention.

When executing a video game that is applied to an embodiment of the present invention by a computer program, an example of a computer 1000, which executes the computer program, is illustrated in FIG. 1. The computer 1000 is constructed to have mainly a computer main body 101, which is specially designed for video games. The computer main body 101 includes a control section 103 connected to its internal bus 119, a RAM (Random Access Memory) 105, a hard disk drive (HDD) 107, a sound processor 109, a graphics processor 111, a DVD/CD-ROM drive 113, a communications interface 115, and an interface section 117.

The sound processor 109 of the computer main body 101 is connected to a sound output device 125, which is a speaker, and a graphics processor 111 is connected to a display device 121 having a display screen 122. Furthermore, a storage medium (DVD-ROM or CD-ROM) 131 can be loaded to the DVD/CD-ROM drive 113. The communications interface 115 is connected to a network 151. An input section (controller) 161 and a memory card 162 are connected to the interface section 117.

The control section 103 includes a CPU (Central Processing Unit), a ROM (Read Only Memory), etc., and executes a program stored on the HDD 107 or the storage medium 131, and controls the computer 1000. The RAM 105 is a work area for the control section 103. The HDD 107 is a storage area for storing a program and data. In the case where a program executed by the control section 103 instructs the sound processor 109 to perform a sound output, the sound processor 109 interprets the instruction and output a sound signal to the sound output device 125.

The graphics processor 111 develops an image onto the frame memory 112 and outputs a video signal, which displays the image on the display screen 122 of the display device 121 according to a drawing command output from the control section 103. It is assumed that one frame time of the image included in the outputting video signal is, for example, 1/30 sec. The DVD/CD-ROM drive 113 performs writing/reading of the program and data to/from the storage medium 131. The communications interface 115 is connected to the network 151 to perform communications with other computers such as a server apparatus, which exists on the network 151 to advance the game in cooperation with other computers.

The interface section 117 outputs input data from the input section 161 to the RAM 105, and the control section 103 interprets it to carry out arithmetic processing. The input section 161, inclusing a directional key and multiple operation keys, moves a character (to be described later) by the operation of the directional key, and performs predetermined processing by the operation of the operation keys. Moreover, the interface section 117 forwards data, indicative of the progress of the game stored in the RAM 105, to the memory card 162 based on the instruction from the control section 103. The interface section 117 reads data of the game stored in the memory card 162 at the time of stopping the game, and transfers read data to the RAM 105.

The program and data relating to the present invention are first stored to, for example, the storage medium 131. The program and data are read by the DVD/CD-ROM drive 113 and loaded onto the RAM 105 at the time of execution. The control section 103 processes the program and data relating to the present invention loaded onto the RAM 105, outputs a drawing command to the graphics processor 111, and outputs an instruction of a sound output to the sound processor 109. Intermediate data is stored to the RAM 105 while the control section 103 performs processing.

In connection with the computer 1000, any general-purpose personal computer may be used as the computer main body 101 if the similar structural components are provided. A cellular phone having the same function as that of the computer 1000 may be used. A portable video game player, which contains the display device 121 and the sound output device 125 in the same cabinet as that of the computer main body 101, may also be used.

In the case where the computer main body 101 is a portable video game player, a semiconductor memory card may be used as the storage medium 131 in place of a DVD-ROM or CD-ROM. A card slot for inserting the memory card may be formed in place of the DVD/CD-ROM drive 113. In the case where the computer main body 101 is a general-purpose personal computer, the program and data relating to the present invention may be prestored to the HDD 107 instead of being stored to the storage medium 131. Regarding the storage medium for storing the program and data relating to the present invention, any kind of storage medium may be used according to the physical form of hardware and the distribution thereof.

An explanation will be next given of various kinds of data that are necessary for executing the video game according to this embodiment. In this video game, a player controls the input section 161 to operate a character (player character) to be moved on a field formed in a virtual three-dimensional space, and the game thereby progresses. The virtual three-dimensional space having the field formed is indicated by a world coordinate system (X, Y, Z). The field is composed of multiple surfaces, and shows coordinates of a vertex of each structural surface as a characteristic point.

Figure 2:
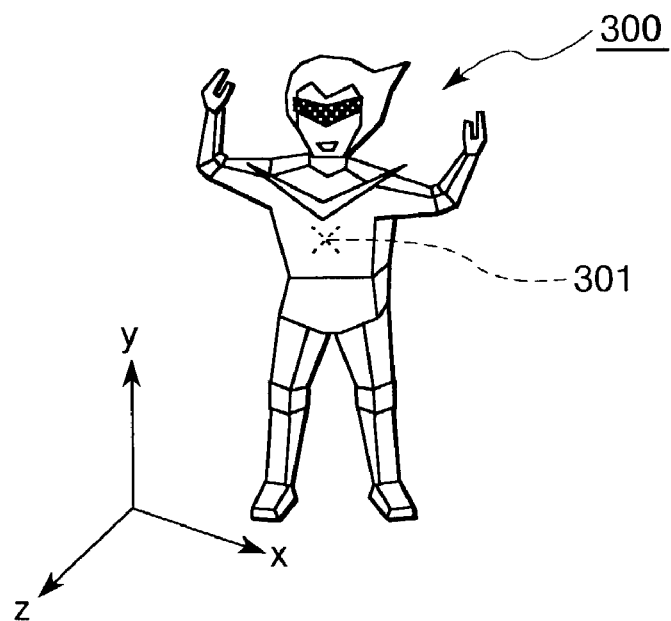
FIG. 2 is a view illustrating an example of a player character that moves in a virtual three-dimensional space.

FIG. 2 is a view illustrating an example of the player character. A player character 300 is formed by polygons, and is indicated by a local coordinate system (x, y, z). A substantially central point of the player character 300 is set as a reference point 301, and its position in the three-dimensional space is indicated by the world coordinate system of the reference point 301. A direction of the player character 300 is indicated by an angle which each axis of the local coordinate system forms with respect to each axis of the world coordinate system. Then, the coordinates of the characteristic point of the player character 300 (a vertex of each polygon) are transformed to the coordinates of the world coordinate system.

Figure 3:
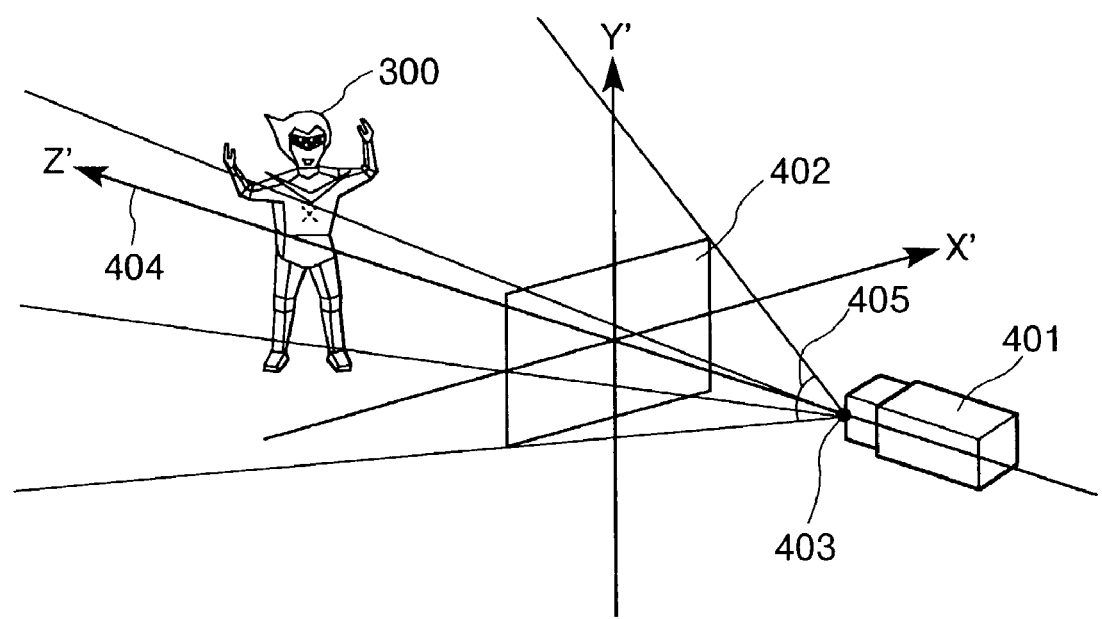
FIG. 3 is a view schematically illustrating processing for performing perspective transformation on the virtual three-dimensional space including the player character to display.

An image, showing a state where the player character 300 moves on the field in the virtual three-dimensional space, is displayed on the display screen by performing perspective transformation on the virtual three-dimensional space using a virtual camera. The player thereby recognizes the state from the image. FIG. 3 schematically shows the state of this perspective transformation. A virtual camera 401 is placed in the virtual three-dimensional space, and an image projected on a virtual screen 402 becomes an image to be displayed on the display screen 122. The position of the virtual camera 401 is a view point 403, the direction of the virtual camera 401 is an optical axis 404, and an area formed by four straight lines, which connect the view point 403 to four corners of the virtual screen 402, is a field of view 405. The size of the virtual screen 402 is fixed. When a width of the field of view 405 is decided, the position of the virtual screen 402 is decided. Namely, when the position of the virtual screen 402 is decided, the width of the field of view 405 is decided.

A coordinate system used to project the image on the virtual screen 402 is a view coordinate system (X', Y', Z'), and the direction of the optical axis 404 is a Z'-axis of the view coordinate system. The coordinates of the world coordinate system (including the coordinates transformed from the coordinates of the local coordinate system) are transformed to the coordinates of the view coordinate system, and processing for perspective transformation including hidden surface removal processing (described below) is carried out.

For generating an image displayed on the virtual screen 402 by the perspective transformation, the hidden surface removal must be carried out to remove a surface that is hidden by another object existing in front of the hidden object. A Z-buffer method is herein used as a hidden surface removal method. When the coordinates of the world coordinate system are transformed to the coordinates of the view coordinate system, the control section 103 sends the coordinates of each characteristic point to the graphics processor 111 and outputs a drawing command thereto. Based on the drawing command, the graphics processor 111 updates the contents of the Z-buffer such that data (a value of Z') of a point existing at the front side (a small point of a Z'-coordinate) remain in connection with each characteristic point. Then, every time when the update is carried out, the graphics processor 111 develops image data on the corresponding characteristic point onto the frame memory 112.

Figure 4:
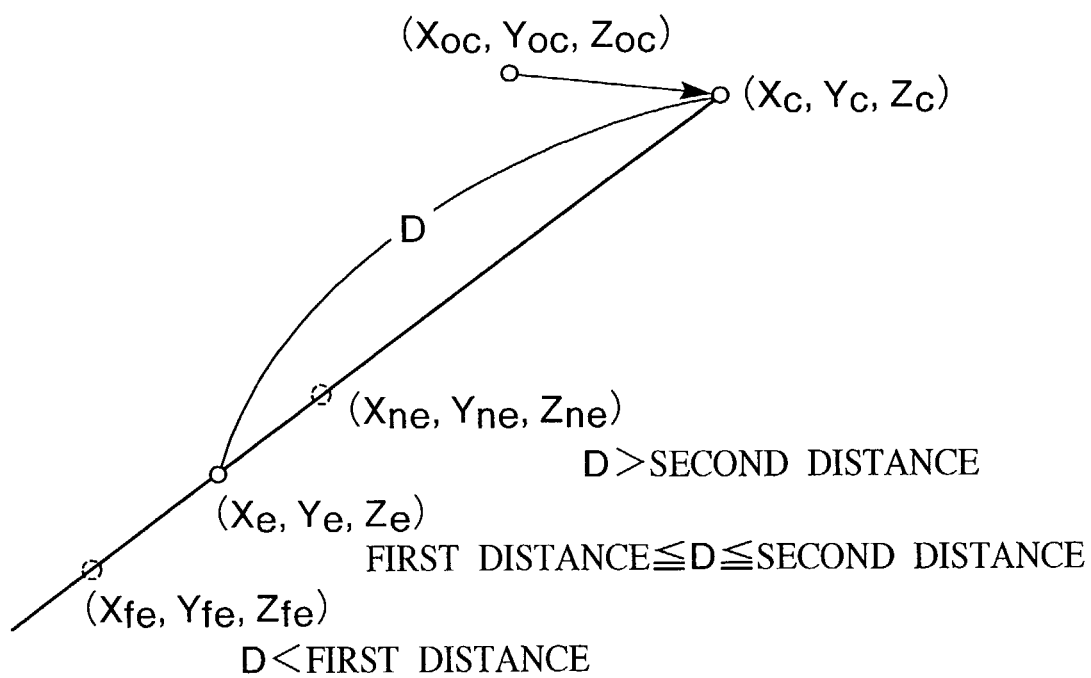
FIG. 4 is a view explaining processing for deciding a position of a new view point according to a position of the player character.

The position of the view point 403 at the time of perspective transformation in each frame is decided based on a distance between the position of the player character 300 during the corresponding frame period and the position of the view point 403 during the previous frame period. FIG. 4 is a view explaining processing for deciding the position of a new view point 403 according to the position of the player character 300.

In FIG. 4, coordinate points (Xc, Yc, Zc) indicate the position of the player character 300 during the current frame period. Coordinate points (Xoc, Yoc, Zoc) indicate the position of the player character 300 during the previous frame period. Coordinate points (Xe, Ye, Ze) indicate the position of the view point 403 during the previous frame period. Moreover, coordinate points (Xfe, Yfe, Zfe) indicate the position of the view point 403 when a distance between the position of the player character 300 and the position of the view point 403 during the previous frame is less than a first distance. Furthermore, coordinate points (Xne, Yne, Zne) indicate the position of the view point 403 when the distance between the position of the player character 300 and the position of the view point 403 in the previous frame is greater than a second distance.

The first distance is a critical near distance where the distance between the position of the player character 300 and the position of the view point 403 is nearest in a state that the position of the view point 403 is a boundary where no further movement of the view point 403 is performed. The first distance is set to such a predetermined distance that the size of the player character 300 does not exceed a fixed size on the display screen 122 and that a background image can be recognized. The second distance is a critical far distance where the distance between the position of the player character 300 and the position of the view point 403 is farthest in a state that the position of the view point 403 is a boundary where no further movement of the view point 403 is performed. The second distance is longer than the first distance, and is set to such a predetermined distance that the size of the player character 300 does not become smaller than a fixed size on the display screen 122 so that the player can easily recognize the player character 300.

When deciding a new position of the view point 403, a distance D between the position of the player character 300 during the current frame period and the position of the view point 403 during the previous frame period can be obtained by equation (1) described below:

$$D = \sqrt{(Xc-Xe)^2 + (YC-Ye)^2 + (Zc-Ze)^2} \tag{1}$$

It is determined whether the distance D is less than the first distance or whether the distance D exceeds the second distance. If the distance D is less than the first distance, coordinate values of the position of the view point 403 during the current frame period are obtained by equation (2) described below. If the distance D is greater than the second distance, coordinate values of the position of the view point 403 during the current frame period are obtained by equation (3) described below. If the distance D is no smaller than the first distance and no greater than the second distance, the position of the view point 403 during the previous frame period is determined to be the position of the view point 403 during the current frame period.

$$(Xne, Yne, Zne) = (Xe, Ye, Ze) + n(Xc - Xe, Yc - Ye, Zc - Ze) \quad (2)$$

$$(Xfe, Yfe, Zfe) = (Xe, Ye, Ze) - m(Xc - Xe, Yc - Ye, Zc - Ze) \quad (3)$$

In the above equations, m and n are constants each being larger than 0 and set to predetermined value by which a moving velocity of the view point 403 is equal to or greater than a moving velocity of the player character 300. Namely, a moving distance of the view point 403 is equal to or greater than a moving distance of the player character 300 in one frame period (described later).

In order to display the field formed in the virtual three-dimensional space and the player character 300 existing on the field on the display screen 122 as a two-dimensional image, processing such as shading, texture mapping, etc., is required. However, since such processing is not particularly related to the present invention, the detailed explanation is omitted.

The following will explain the progress of the game that is executed by the computer 1000 according to this embodiment. The explanation hereinafter is given of an example of a case when the player character 300 moves on a map according to an instruction from a player. It is assumed that no obstruction exists between the player character 300 and the view point 403 of the virtual camera 401.

Figure 5:
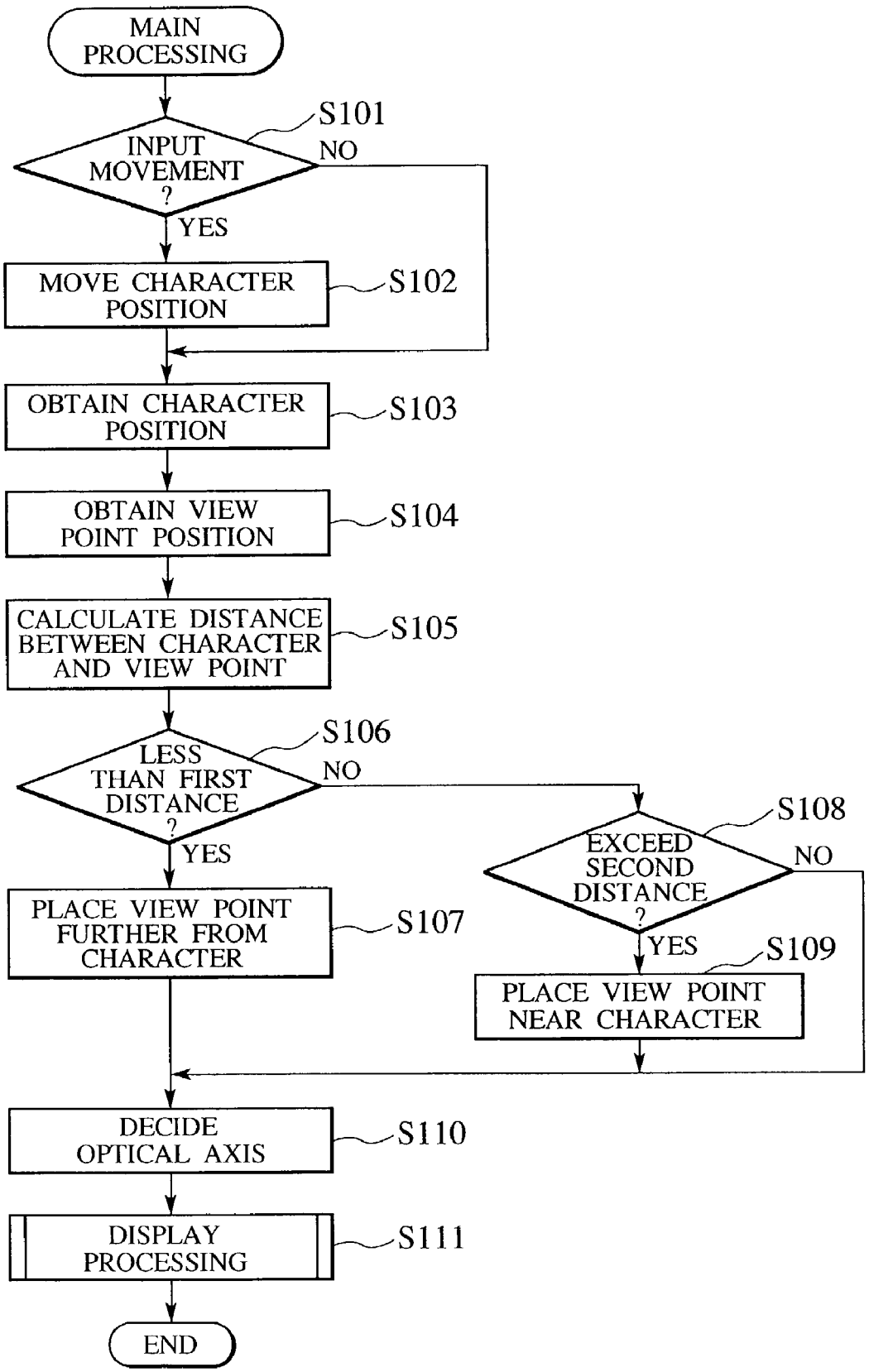
FIG. 5 is a flowchart illustrating a main processing in the video game according to an embodiment of the present invention.

FIG. 5 is a flowchart showing main processing in the video game according to this embodiment. This processing is executed by a timer interruption caused for each frame time (every $\frac{1}{30}$ second in this case), and is ended within at least one frame time (within $\frac{1}{30}$ second in this case).

The control section 103 determines whether data, which is input data received by the interface section 117 from the input section 161 and which instructs movement of the player character 300 according to the player's operation of the directional key, is stored in the RAM 105 (step S101). In the case where data, which instructs movement of the player character 300, is not stored therein, the processing flow proceeds to S103 directly.

In the case where data, which instructs movement of the player character 300, is stored therein, the control section 103 obtains a position after the player character has moved (coordinates of the reference point 301 at the world coordinate system and an angle which the local coordinate system of the player character 300 forms with respect to the world coordinate system) according to data, which instructs movement of the player character 300 stored in the RAM 105, and the position of the player character 300 obtained prior to the previous frame period. Then, the control section 103 overwrites the obtained result on the RAM 105 and stores it therein (step S102). After that, the processing flow proceeds to S103.

In step S103, the control section 103 obtains the position of the player character 300 stored in the RAM 105. The control section 103 obtains the position of the view point 403 obtained in step S107 or S109 (to be described later) during the previous frame period (step S104). The control section 103 calculates equation (1) according to the position of the player character 300 obtained in step S103 and the position of the view point 403 obtained in step S104 to obtain a distance D between the position of the player character 300 during the current frame period and the position of the view point 403 during the previous frame period (step S105).

The control section 103 determines whether the obtained distance D is less than the first distance (step S106). In the case where the obtained distance D is less than the first distance, the control section 103 obtains a position of a new view point 403 according to equation (2), and moves the position of the view point 403 during the current frame period to a position farther from the position of the player character 300 as compared with the position of the view point 403 during the previous frame period (step S107). After that, the processing flow proceeds to step S110.

In the case where the obtained distance D is greater than or equal to the first distance, the control section 103 determines whether the distance D exceeds the second distance (step S108). In the case where the distance D exceeds the second distance, the control section 103 obtains a position of a new view point 403 according to equation (3), and moves the position of the view point 403 during the current frame period to a position nearer to the position of the player character 300 as compared with the position of the view point 403 during the previous frame period (step S109). After that, the processing flow proceeds to step S110. In the case where the distance D is the second distance or less, the processing flow proceeds to step S110.

After obtaining the position of the new view point 403 in step S107 or S109, or setting the position of the view point 403 at the same position as that of the previous frame period in a state that the determination result in step S108 is NO, the control section 103 decides the direction of the optical axis 404. The direction of the optical axis 404 can be placed to the direction of the reference point 301 of the player character 300 (step S110). The width of the view point 405 (the distance of the virtual screen 402 from the view point 403) is maintained constant regardless of the position of the view point 403 and the direction of the optical axis.

When the view point 403 of the virtual camera 401 and the optical axis 404 are decided, the control section 103 performs perspective transformation on the virtual three-dimensional space including the player character from the view point 403 onto the virtual screen 402 fixed by the view point 405. Then, the control section 103 carries out display processing for generating a two-dimensional image to be displayed on the display screen 122 (step S111). When the display processing is ended, this main processing is finished and main processing is executed again at a start timing for a next frame period.

An explanation is briefly given of the display processing of step S111. The control section 103 transforms all coordinates at the local coordinate system of each characteristic point of the player character 300 to coordinates at the world coordinate system based on the coordinates of the reference point 301 at the world coordinate system and the direction of the player character 300. The control section 103 transforms the coordinates of points, which constitute the respective surfaces that form the player character 300 and the field included in the range where perspective transformation is performed, to the coordinates of the view coordinate system according to the coordinates of the view point 403 at the world coordinate system and the direction of the optical axis 404. The control section 103 sends the coordinates of the points constituting the respective surfaces transformed to the view coordinate system, and outputs a drawing command to the graphics processor 111.

The graphics processor 111, which has received the drawing command, updates the contents of a z buffer such that data (a value of Z') of a point existing at the front side (a small value of a Z'-coordinate) remains in connection with the respective points that constitute the respective surfaces based on the coordinates of the view coordinate system. In the case where the content of the Z-buffer is updated, the graphics processor 111 develops image data on the corresponding point onto the frame memory 112. The graphics processor 111 performs processing such as shading, texture mapping and the like when developing the image data.

The graphics processor 111 reads the image data developed onto the frame memory 112, sequentially. Then, the graphics processor 111 adds a synch signal to generate a video signal, and outputs it to the display device 121. The display device 121 displays an image, which corresponds to the video signal output from the graphics processor 111, on the display screen 122. The image on the display screen 122 is changed for each frame time, allowing the player to see the image in which the player character moves on the field and the view point also moves according to the movement of the player character 300.

The following will specifically explain the relationship between the position of the player character 300 and the position of the view point 403 in the video game according to this embodiment regarding a case when the player character 300 moves near to the view point 403 and a case when the player character moves away from the view point 403.

FIGS. 6A to 6E are views each showing the relationship between the position of the player character 300 and the position of the view point 403 when the player character advances in the direction of the view point 403. FIGS. 7A to 7E are views each showing an image on the display screen 122 in each of the cases shown in FIGS. 6A to 6E. It is herein assumed that a building 200 exists on the field, which is present at the background of the player character 300, in order to show the positional relationship to be easily understandable. It is also assumed that the player character 300 moves on a straight line in only one direction and that there is no change in level. In FIGS. 6A to 6E, the position of the player character 300 is indicated by Ca to Ce, the position of the view point 403 is indicated by Ea to Ec, and the position of the building 200 is indicated by B.

Figure 7A:
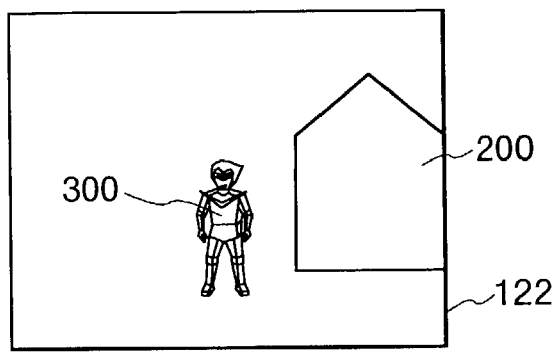
FIGS. 7A to 7E are views each illustrating an image on a display screen in FIGS. 6A to 6E.

Suppose that the player character 300 is placed at the position Ca near the position B of the building 200 in the first frame period as shown in FIG. 6A. Also, suppose that the view point 403 is placed at the position Ea. An image on the display screen 122 at this time is shown in FIG. 7A. The distance D between the position Ca of the player character 300 and the position Ea of the view point 403 at this time is longer than the first distance.

Figure 7B:
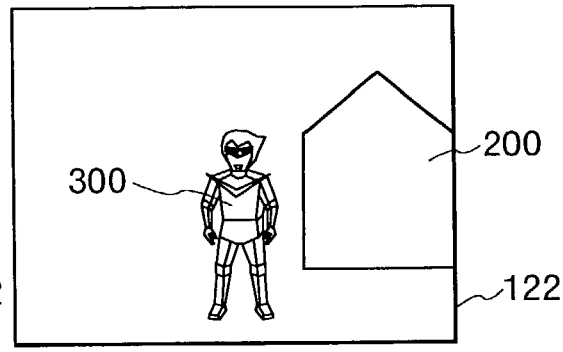
Figure 7C:
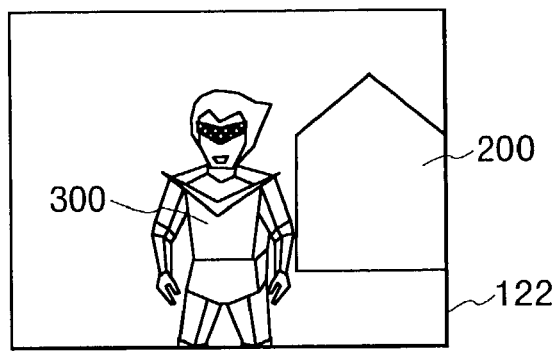
Figure 7D:
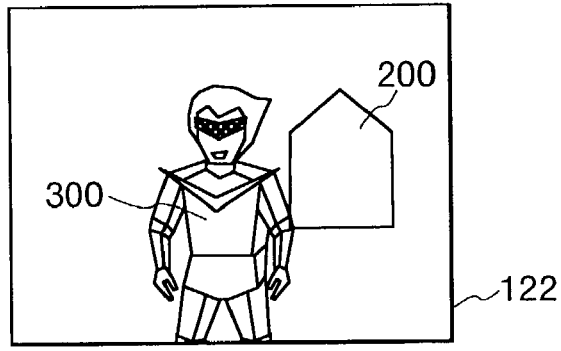
Figure 7E:
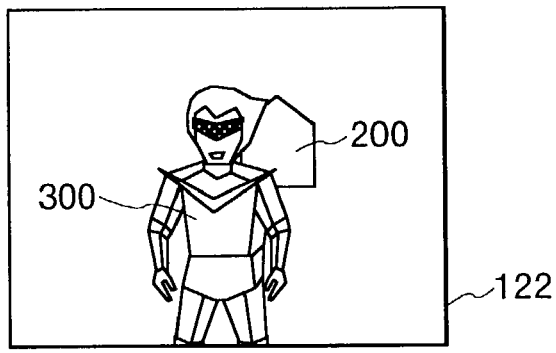

It is assumed that the player character 300 moves towards the view point 403 until a next frame period and the positional relationship between the position B of the building 200 and the position Cb of the player character 300 is thereby established as shown in FIG. 6B. Since the distance D between the position Cb of the player character 300 and the position Ea of the view point 403 in the previous frame period is longer than the first distance, the view point 403 in the current frame period is placed at the position Ea, as in the previous frame period. An image on the display screen 122 at this time is shown in FIG. 7B. Since the player character 300 slightly moves near to the view point 403, the player character 300 is displayed larger than the case of FIG. 7A.

Since the distance between the position B of the building 200 and the position Ea of the view point 403 is unchanged, the building 200 is displayed with the same size as the case of FIG. 7A.

It is assumed that the player character 300 moves in the direction towards the view point 403 until a next frame period and the positional relationship between the position B of the building 200 and the position Cc of the player character 300 is thereby established as shown in FIG. 6C. Suppose that the distance D between the position Cc of the player character 300 and the position Ea of the view point 403 in the previous frame period is the first distance. Since the distance D is not less than the first distance here, the view point 403 in the current frame period stays at the position Ea of the view point 403 in the previous frame period. An image on the display screen 122 at this time can be shown as in FIG. 7C. Since the player character 300 moves nearer to the view point 403, the player character 300 is displayed larger than the case of FIG. 7B. Since the distance between the position B of the building 200 and the position Ec of the view point 403 is unchanged, the building 200 is displayed with the same size as the case of FIG. 7B.

It is assumed that the player character 300 moves in the direction of the view point 403 until a next frame period and the positional relationship between the position B of the building 200 and the position Cd of the player character 300 is thereby established as shown in FIG. 6D. Suppose that the distance D between the position Cd of the player character 300 and the position Ea of the view point 403 in the previous frame period is less than the first distance. The view point 403 moves to the position Eb from the position Ea to be further from the player character 300. An image on the display screen 122 at this time is shown as in FIG. 7D. Since the distance between the player character 300 and the view point 403 is substantially unchanged, the player character 300 is displayed with the same size as the case of FIG. 7C. The distance between the position B of the building 200 and the position Ec of the view point 403 becomes longer and the building 200 is displayed smaller than the case of FIG. 7C.

It is assumed that the player character 300 moves in the direction of the view point 403 until a next frame period and the positional relationship between the position B of the building 200 and the position Ce of the player character 300 is thereby established as shown in FIG. 6E. Suppose that the distance D between the position Ce of the player character 300 and the position Eb of the view point 403 in the previous frame period is less than the first distance. The view point 403 moves to the position Ec from the position Eb to be further from the player character 300. An image on the display screen 122 at this time is shown as in FIG. 7E. Since the distance between the player character 300 and the view point 403 is substantially unchanged, the player character 300 is displayed with the same size as the case of FIG. 7D. The distance between the position B of the building 200 and the position Ec of the view point 403 becomes greater and the building 200 is displayed smaller than the case of FIG. 7D.

FIGS. 8A to 8E are views each showing the relationship between the position of the player character 300 and the position of the view point 403 when the player character 300 advances in the direction opposite to the view point 403. FIGS. 9A to 9E are views each showing an image on the display screen 122 in each of the cases shown in FIGS. 8A to 8E. It is herein assumed that the building 200 exists on the field, which is present at the background of the player character 300, in order to show the positional relationship to be easily understandable. It is assumed that the player character 300 moves on a straight line in only one direction and that there is no change in level. In FIGS. 8A to 8E, the position of the player character 300 is indicated by CCa to CCe, the position of the view point 403 is indicated by EEa to EEc, and the position of the building 200 is indicated by BB.

Figure 9A:
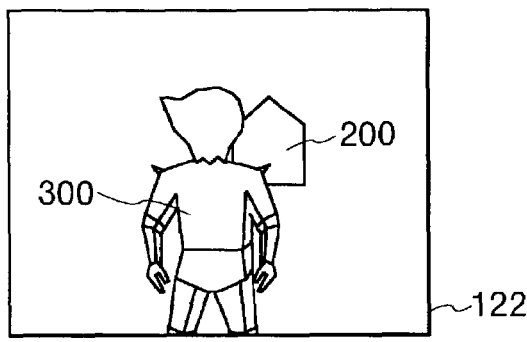
FIGS. 9A to 9E are views each illustrating an image on a display screen in FIGS. 8A to 8E.

Suppose that the player character 300 is placed at the position CCa far away from the position BB of the building 200 in the first frame period as shown in FIG. 8A. Also, suppose that the view point 403 is placed at the position EEa. An image on the display screen 122 at this time is shown in FIG. 9A. Since the player character 300 is placed near to the view point 403, the player character 300 is displayed to appear large. Since the building 200 is placed far away from the view point 403 as compared with cases of FIGS. 9D and 9E to be described later, the building 200 is displayed small. Further, the distance D between the position CCa of the player character 300 and the position EEa of the view point 403 at this time is shorter than the second distance.

Figure 9B:
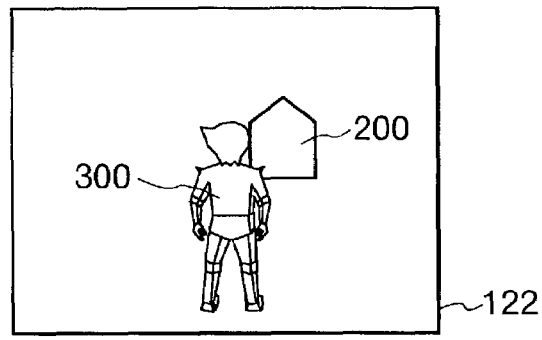

It is assumed that the player character 300 moves in the direction opposite to the view point 403 until a next frame period and the positional relationship between the position BB of the building 200 and the position CCb of the player character 300 is thereby established as shown in FIG. 8B. Since the distance D between the position CCb of the player character 300 and the position EEa of the view point 403 in the previous frame period is shorter than the second distance, the view point 403 in the current frame period is placed at the same position as that of the previous frame period. An image on the display screen 122 at this time is shown in FIG. 9B. Since the player character 300 slightly moves away from the view point 403, the player character 300 is displayed smaller than the case of FIG. 9A. Since the distance between the position BB of the building 200 and the position EEa of the view point 403 is unchanged, the building 200 is displayed with the same size as the case of FIG. 9A.

Figure 9C:
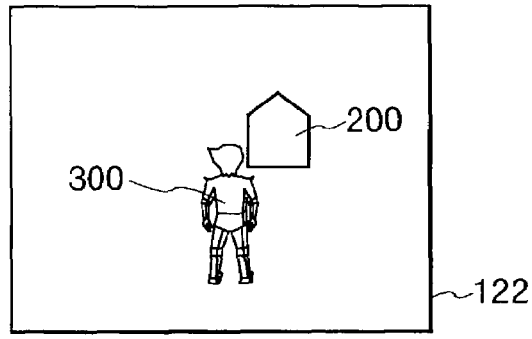

It is assumed that the player character 300 further moves in the direction opposite to the view point 403 until a next frame period and the positional relationship between the position BB of the building 200 and the position CCc of the player character 300 is thereby established as shown in FIG. 8C. Suppose that the distance D between the position CCc of the player character 300 and the position EEa of the view point 403 in the previous frame period is the second distance. Since the distance D does not exceed the second distance here, the view point 403 in the current frame period stays at the same position EEa as that of the previous frame period. An image on the display screen 122 at this time is shown in FIG. 9C. Since the player character 300 moves away from the view point 403, the player character 300 is displayed smaller than the case of FIG. 9B. Since the distance between the position BB of the building 200 and the position EEa of the view point 403 is unchanged, the building 200 is displayed with the same size as the case of FIG. 9B.

Figure 9D:
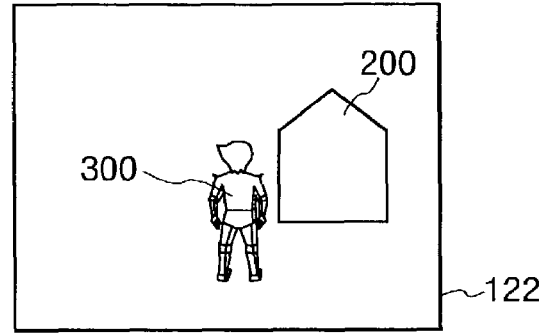

It is assumed that the player character 300 further moves in the direction opposite to the view point 403 until a next frame period and the positional relationship between the position BB of the building 200 and the position CCd of the player character 300 is thereby established as shown in FIG. 8D. The distance D between the position CCd of the player character 300 and the position EEa of the view point 403 in the previous frame period exceeds the second distance. The view point 403 moves to the position EEb from the position EEa to be closer to the player character 300. An image on the display screen 122 at this time is shown in FIG. 9D. Since the distance between the player character 300 and the view point 403 is substantially unchanged, the player character 300 is displayed with the same size as the case of FIG. 9C. The distance between the position BB of the building 200 and the position EEb of the view point 403 becomes short and the building 200 is displayed larger than the case of FIG. 9C.

Figure 9E:
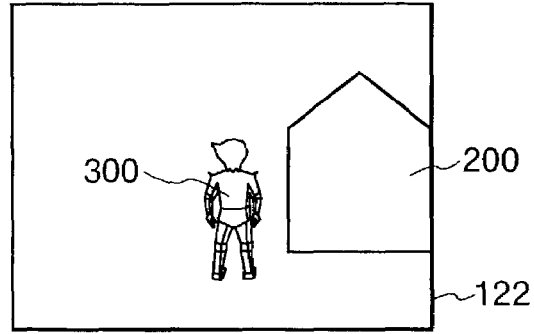

It is assumed that the player character 300 further moves in the direction opposite to the view point 403 until a next frame period and the positional relationship between the position BB of the building 200 and the position CCe of the player character 300 is thereby established as shown in FIG. 8E. The distance D between the position CCe of the player character 300 and the position EEb of the view point 403 in the previous frame period exceeds the second distance. The view point 403 moves to the position EEc from the position EEb to be closer to the player character 300. An image on the display screen 122 at this time is shown in FIG. 9E. Since the distance between the player character 300 and the view point 403 is substantially unchanged, the player character 300 is displayed with the same size as the case of FIG. 9D. The distance between the position BB of the building 200 and the position EEc of the view point 403 becomes shorter, and the building 200 is displayed larger than the case of FIG. 9D.

In order to easily understand the state that the player character 300 moves, in the aforementioned example, the building 200 is displayed as a two-dimensional image on the display screen 112 to perform comparison and contrast between the player character 300 and the building 200. However, even if the player character 300 moves on a field that lacks distinctive features without providing the building 200, the following fact can be said:

Namely, the distance D between the position of the player character 300 and the view point 403 is no smaller than the first distance and no greater than the second distance, the size of the player character 300 to be displayed as an image on the display screen 122 changes whenever the player character 300 is moved near to the view point 403 or moved away therefrom. This allows the player to recognize the fact that the player character 300 moves in the virtual three-dimensional space and the direction thereof from the size of the player character 300 displayed as an image on the display screen.

As explained above, in the video game according to this embodiment, if the distance D between the position of the player character 300 during the current frame period and the position of the view point 403 during the previous frame period is no smaller than the first distance and no greater than the second distance, the position of the view point 403 during the current frame period does not move. In this case, when the player character 300 moves in the virtual three-dimensional space, the size of the player character 300 to be displayed as an image on the display screen 122 changes according to the changing distance between the player character 300 and the view point 403. The player can easily recognize the state that the player character 300 moves in the virtual three-dimensional space.

In the case where the distance D is less than the first distance and the player character 300 moves closer to the view point 403, the position of the view point 403 in the current frame period moves away from the player character 300. In the case where the distance D exceeds the second distance and the player character 300 moves away from the view point, the position of the view point 403 in the current frame period moves closer to the player character 300. The moving velocity of the position of the view point 403 is set to be greater than or equal to the moving velocity of the player character 300.

In display processing of step S111, the distance between the position of the player character 300 and the position of the view point 403 at the time of performing perspective transformation is always no smaller than the first distance and no greater than the second distance, and the size of the player character to be displayed as an image on the display screen 122 is always in a fixed range. This prevents the player character 300 from being displayed on the display screen 122 so large that the background image cannot be seen or the player character 300 from being displayed too small to see. This allows the player to recognize the player character 300 with an appropriate size at all times.

In the case where the distance D is no smaller than the first distance and no greater than the second distance, the position of the view point 403 does not move. Accordingly, an amount of processing for deciding the position of the view point 403 may be small. The width of the field of view 405 is always constant, and does not have to be determined for each frame period. Namely, the amount of processing, which must be carried out before performing perspective transformation on the player character 300 existing in the virtual three-dimensional space, may be small, and this makes it possible to reduce the entire amount of processing.

The player character 300 has one reference point 301 at its substantially central position, and the distance D between the position of the player character 300 and the position of the view point 403 can be obtained using the coordinates of the reference point 301 and the coordinates of the view point 403 according to equation (1). There is no need for complicated processing such as searching for polygonal surfaces that constitute the player character 300, and the distance D can be obtained with a relatively small amount of processing.

The player character 300 is an indispensable element to advance the game, and must be most easily recognized by the player. In the video game relating to this embodiment, the position of the view point 403 is moved in accordance with movement of the player character 300 and the display of the player character 300 is optimized, making it possible to carry out smooth progress of the game.

The present invention is not limited to the aforementioned embodiment, and various modifications and applications may be possible. The following will explain modifications of the aforementioned embodiment that are applicable to the present invention.

In the aforementioned embodiment, the moving velocity of the view point 403 (moving distance of the view point 403 between the previous frame period and the current frame period), which is obtained when the distance D between the position of the player character 300 and the position of the view point 403 is less than the first distance, is constant. Moreover, the moving velocity of the view point 403 (moving distance of the view point 403 between the previous frame period and the current frame period), which is obtained when the distance D between the position of the player character 300 and the position of the view point 403 exceeds the second distance, is also constant. However, the moving velocity of the view point 403 to be moved in step S107 or S109 may be variable.

In the case where the moving velocity of the view point 403 is varied, a first example can be explained as follows. Namely, in step S107 or S109, the control section 103 may obtain a distance where the player character 300 has moved between the previous frame period and the current frame period, and may move the position of the view point 403 by a distance corresponding to the obtained distance. A second example can be explained as follows. Namely, in step S107 or S109, the control section 103 may determine how far the distance D has fallen below the first distance or exceeded the second distance, and may move the position of the view point 403 by a distance corresponding to the distance fallen below or exceeded.

Thus, the moving velocity of the view point 403 is made variable, so that not only the movement of the view point 403 but also the moving velocity thereof follows the movement of the player character 300. Accordingly, the player can more easily recognize how the player character 300 moves in the virtual three-dimensional space in the image displayed on the display screen 122 as compared with the above-explained embodiment.

The aforementioned embodiment has explained the case in which the position of the view point 403 is moved within one frame period when the distance D between the position of the player character 300 and the position of the view point 403 in the previous frame period is less than the first distance or exceeds the second distance. In contrast to this, the following may be possible. Namely, when the distance D is less than the first distance or exceeds the second distance, a position of a moving destination of the view point 403 is obtained and the position of the view point 403 is gradually moved to the obtained moving destination during multiple frame periods. In this case, the moving distance of the view point 403 during one frame period is suppressed to be within a fixed range. The player may not be confused by an abrupt switching of the background of the image displayed on the display screen 122.

Figure 10:
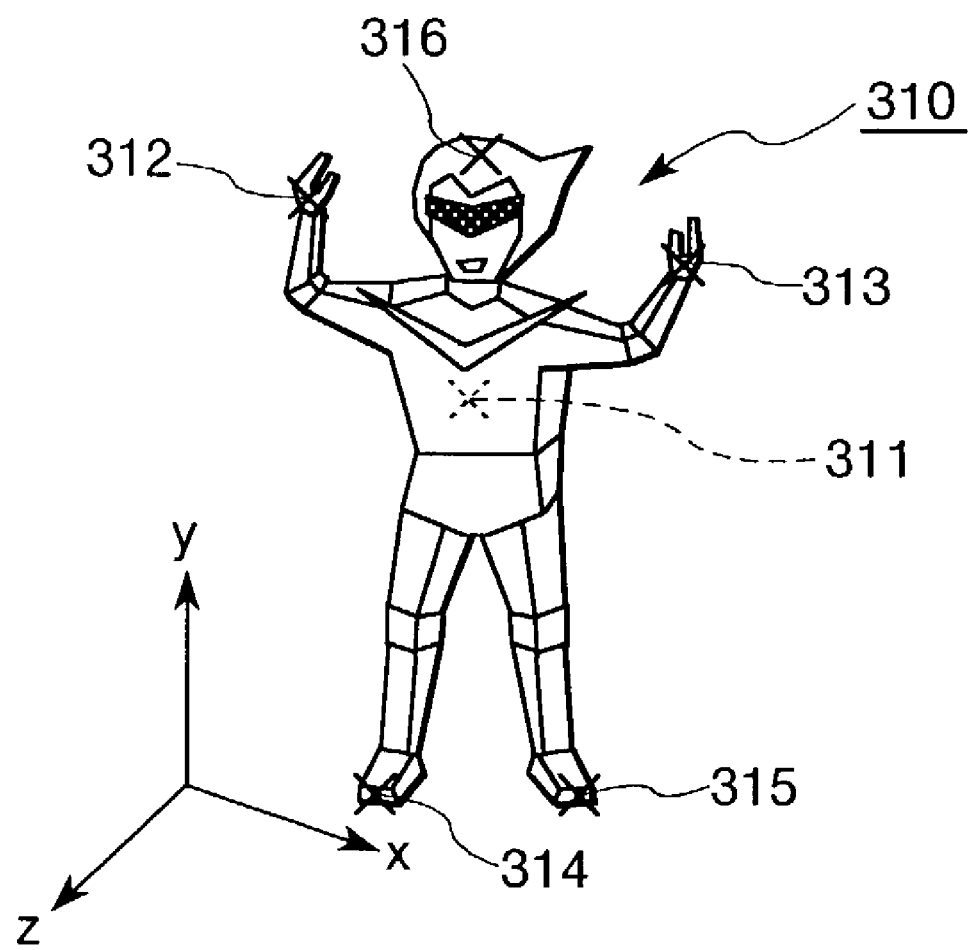
FIG. 10 is a view illustrating another example of the player character.

In the aforementioned embodiment, the player character 300 has one reference point 301 and the control section 103 obtains the distance between the position of the reference point 301 and the view point 403 as a distance between the position of the player character 300 and the position of the view point 403. In contrast to this, the player character 300 may have multiple reference points. FIG. 10 illustrates an example of a player character having multiple reference points. A player character 310 has reference points 312 to 316 at tip ends of hands, tip ends of feet, and a head in addition to a reference point 311 provided at a substantially central point.

In the case of using the player character 310, to obtain a distance between the position of the player character 310 and the position of the view point 303 in step S105, the control section 103 obtains each of distances d1 to d6 each between the position of the view point 403 and each position of the respective reference points 311 to 316. In accordance with the distances d1 to d6 each between the view point 403 and each of the reference points 311 to 316, the distance D between the position of the player character 310 and the position of the view point 403 can be obtained as follows.

In connection with a first example, an average of the distances d1 to d6 can be used as the distance D. In connection with a second example, the shortest distance of distances d1 to d6 can be used as the distance D. By using such methods, more appropriate value than the aforementioned embodiment can be used as a value of the distance D between the position of the view point 403 and the position of the player character 300. Such methods become effect particularly in using the player character whose shape and size change abruptly.

In the aforementioned embodiment, the view point 403 of the virtual camera moves in accordance with the movement of the player character 300. In contrast to this, though the position of the view point 403 is fixed, the width of the field of view 405 (distance from the view point 403 to the virtual screen 402) may be changed. Even if the width of the field of view is changed, it is possible to obtain substantially the same effect as the case that the view point 403 is moved as in the above-explained embodiment.

Figure 11:
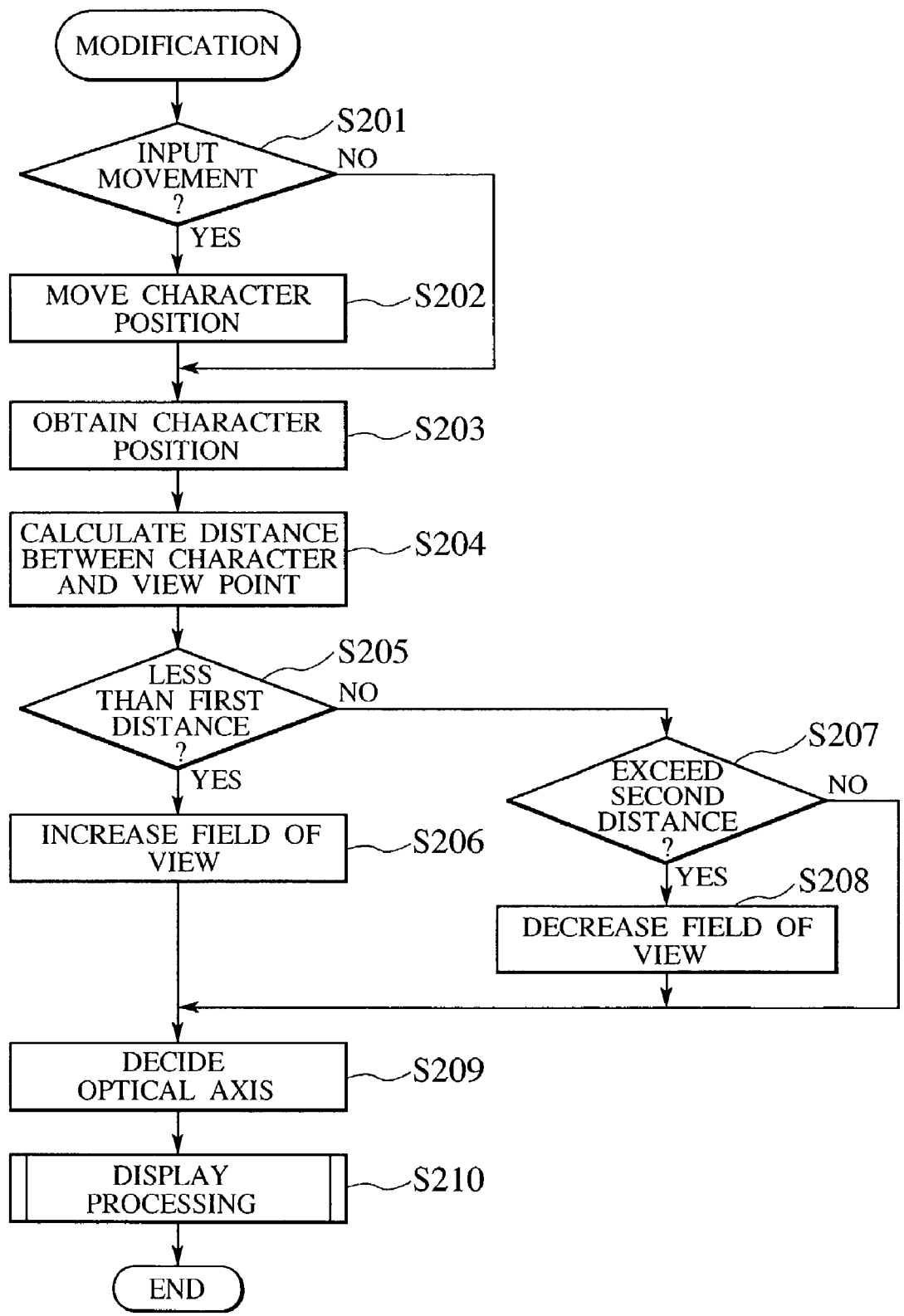
FIG. 11 is a flowchart showing a main processing in a video game according to a modification of an embodiment of the present invention.

FIG. 11 is a flowchart showing a main processing according to this modification. Processing in steps S201 to S203 is the same as processing in steps S101 to S103. When obtaining the position of the player character 300 in step S202, the control section 103 obtains the distance D between the position of the predetermined view point 403 and the position of the player character 300 obtained in step S203 (step S204).

The control section 103 determines whether the obtained distance D is less than the first distance (step S205). In the case where the distance D is less than the first distance, the control section 103 increases the width of the field of view 405 so as to reduce the size of the player character 300 displayed on the virtual screen 402 (step S206). Thereafter, the processing flow proceeds to step S209.

In the case where the distance D is the first distance or greater in step S205, the control section 103 determines whether the distance D exceeds the second distance (step S207). In the case where the distance D exceeds the second distance, the control section 103 decreases the width of the field of view 405 so as to increase the size of the player character 300 displayed on the virtual screen 402 (step S208). Thereafter, the processing flow proceeds to step S209. If the distance D is the second distance or less, the processing flow proceeds to step S209, directly.

The processing in steps S209 and S210 is the same as processing in steps S110 and S111. The first and second distances in this modification can use the same values as the case of the above-described embodiment. In the case where the width of the field of view 405 is changed in step S206 or S208, the control section 103 can decide the width of the field of view 405 based on the distance D obtained in step S204 and the size of the player character 300.

If the distance D between the position of the player character 300 and the position of the view point 403 is out of a predetermined range, the width of the field of view 405 is changed in accordance with the movement of the player character 300. The background displayed as a two-dimensional image on the display screen 122 is changed by the change of the width of the field of view 405. Accordingly, the player can easily recognize that the player character 300 moves in the virtual three-dimensional space. In the case where the distance D is in the predetermined range and the width of the field of view 405 is unchanged, the size of the player character 300 displayed as a two-dimensional image on the display screen 122 is changed by the variation of the distance between the position of the player character 300 and the position of the view point 403. Accordingly, the player can easily recognize that the player character 300 moves in the virtual three-dimensional space.

The size of the player character 300 displayed as a two-dimensional image on the display screen 122 can be maintained to some extent in the range. Accordingly, the player can see the player character 300, which is the most important object for the progress of the game, with the size of the appropriate range. If the distance D is in a predetermined range from the position of the view point 403 to the position of the player character 300, there is no need for changing not only the position of the view point 403 but also the width of the field of view 405, with the result that the amount of processing can be reduced.

In the aforementioned embodiment, the optical axis 404 of the virtual camera 401 is always directed to the player character 300. In contrast to this, the control section 103 may not change the direction of the optical axis 404 during the previous frame period when the distance D is no smaller than the first distance and no greater than the second distance and the view point 403 of the virtual camera is not moved or the width of the field of view 405 is not changed. The control section 103 may change the direction of the optical axis 404 only when the view point 403 is moved or the width of the field of view 405 is changed.

In the aforementioned embodiment, in the case where the distance D between the position of the player character 300 and the position of the view point 403 in the previous frame period is no smaller than the first distance and no greater than the second distance, the position of the view point 403 is unchanged. However, depending on the field formed in the virtual three-dimensional space, there is a case that the player character 300 is not displayed in the image on the display screen 122 by the presence of an obstruction between the player character 300 and the view point 403 even if the distance D is no smaller than the first distance and no greater than the second distance. Moreover, there is a case when an obstruction is present between the position of the moving destination and the player character 300 even if the distance D is less than the first distance or exceeds the second distance and the position of the view point 403 moves.

By adding processing as shown in FIG. 12 to the flowchart of FIG. 5, it is possible to avoid the aforementioned problems. In the case where the control section 103 determines that the position of the view point 403 is moved in step S107 or S109, or the distance D is the second distance or less, the control section 103 determines whether there is an obstruction (e.g., surfaces that constitute the field in the virtual three-dimensional space) present between the position of the view point 403 (position where the view point 403 has moved) and the player character 300 (step S121). If there is no obstruction, the processing flow proceeds to step S110, directly.

If there is an obstruction, the control section 103 searches for a position of a new view point 403 where no obstruction is present between the position of the player character 300 and the position of the new view point 403. For example, an intersection point of a straight line, which connects the position of the player character 300 to the position of the view point 403, and a surface, which the corresponding obstruction forms, can be used as the position of the new view point 403 (step S122). The control section 103 moves the position of the view point 403 to the position searched for in step S122 (step S123), and the processing flow proceeds to step S110.

By adding the aforementioned processing, the player can always recognize where on the field the player character 300 is present from the image displayed on the display screen 122. A trace of movement of the player character 300 is registered in a table, and the control section 103 can thereby select the position of the view point 403 from the previous position of the player character 300 registered in the table when searching for the position of the view point 403 where no obstruction is present between the position of the player character 300 and the position of the new view point 403 in step S122.

In the aforementioned embodiment, the position of the view point 403 of the virtual camera 401 is moved only when the distance D between the position of the player character 300 and the position of the view point 403 is less than the first distance or exceeds the second distance. This is because the size of the player character 300 in the image on the display screen 122 is optimized and the player can easily recognize the movement of the player character 300 from the image on the screen display 122.

However, if the player character 300 exceeds a fixed range within a fixed period and does not move in the virtual three-dimensional space, it is not really necessary for the player to recognize the movement of the player character 300 from the image on the display screen 122. By adding processing as shown in FIGS. 13A and 13B to the flowchart of FIG. 5, it is possible to optimize the size of the player character 300 in the image on the display screen 122.

After moving the position of the view point 403 in step S107 or S109, the control section 103 sets a moving distance measurement mode (step S131) and resets a value of a time variable stored in the RAM 105 to 0 (step S132). The control section 103 temporarily stores the position of the current player character 300 to the RAM 105 (step S133). After that, the processing flow proceeds to step S110. When the distance D between the position of the player character 300 and the position of the view point 403 is no smaller than the first distance and no greater than the second distance and the position of the view point 403 is not moved, processing in step S131 to S133 is not executed.

In the case where data for instructing movement of the player character 300 is not stored in step S101 or the position of the player character 300 is moved in step S101, the control section 103 determines whether the moving distance measurement mode is set (step S134). If the moving distance measurement mode is not set, the processing flow proceeds to step S103.

If the moving distance measurement mode is set, the control section 103 increases the value of the variable by one (step S135). The control section 103 calculates a moving distance of the player character 300 in the moving distance measurement mode according to the position temporarily stored at a previous time (this is not limited to the immediately previous frame period) in step S133 and the position at which the player character 300 is moved in step S102 (step S136). The control section 103 determines whether the moving distance of the calculated player character 300 exceeds a predetermined distance (distance that is sufficiently shorter than the second distance) (step S137). If the moving distance exceeds the predetermined distance, the control section 103 releases the moving distance measurement mode (step S138). After that, the processing flow proceeds to step S103.

If the moving distance of the player character 300 calculated in step S136 does not exceed the predetermined distance, the control section 103 determines whether the value of the time variable exceeds a predetermined value, that is, a predetermined period of time has passed after the moving distance measurement mode (step S139). If the value of the time variable does not exceed the predetermined value, the processing flow proceeds to step S103.

If the value of the time variable exceeds the predetermined value, the control section 103 moves the position of the view point 403 to a position, which is on a straight line that connects the position of the current view point 403 to the position of the player character 300 and which is an intermediate distance where the distance between the view point 403 and the player character 300 is longer than the first distance and shorter than the second distance (step S140). After that, the control section 103 releases the moving distance measurement mode (step S141), and the processing flow proceeds to step S110.

As mentioned above, when the player character 300 does not move more than the fixed distance within the fixed period after moving the view point 403, it is little necessary for the player to recognize the movement of the player character 300. At this time, the position of the view point 403 is moved to the position where the distance D between the position of the view point 403 and the position of the player character 300 is the intermediate distance. Since the intermediate distance is longer than the first distance and shorter than the second distance, the player character 300 on the display screen 122 becomes an intermediate size. The player character 300 is thereby displayed in the image on the display screen 122 with a more appropriate size.

The above-mentioned intermediate distance is preferably set to such a value that the size of the player character 300 on the display screen 122 becomes an appropriate size. Though it is necessary for the intermediate distance D to be greater than the first distance and smaller than the second distance, the intermediate distance D may be just an intermediate distance between the first distance and the second distance. The moving distance of the player character 300, which serves as a criterion on whether the moving distance measurement mode should be released, may be 0. If the player character 300 slightly moves, the moving distance measurement mode may be released in step S138.

There is a case in which the moving distance of the player character 300 does not exceed a predetermined range even after the position of the view point 403 is moved in step S107 or S109. In this case, the position of the view point 403 may be moved to the position where the distance D between the player character 300 and the view point 403 becomes the intermediate distance.

In the aforementioned embodiment, the position of the view point 403 moves in accordance with the movement of the player character 300. However, there is a video game where another character, which exerts an important influence upon the progress of the game in the same degree as the player character 300, exists. For example, in a network game, there is a character that is a party to the player character 300 or a character on the occurrence of a specific event. The position of the view point 403 may move in accordance with movement of such other characters other than the player character 300.

In the aforementioned embodiment, the program for executing the video game of the present invention is stored in the storage medium 131 and distributed. In contrast to this, this program may be stored to a fixed disk device that a Web server apparatus existing on the network 151 has. In accordance with a request from the computer main body 101 of FIG. 1, the Web server apparatus may convert program data stored in the fixed disk device to a signal and superimpose the signal on a carrier wave to distribute to the computer main body 101 via the network 151 and the communication medium 141. The program, which the communications interface 115 has received from the Web server, is stored in the HDD 107 and is loaded on the RAM 105 at an executing time.

Although the invention has been described with reference to several exemplary embodiments, it is understood that the words that have been used are words of description and illustration, rather than words of limitation. Changes may be made within the purview of appended claims, as presently stated and as amended, without departing from the scope and spirit of the invention in its aspects. Although the invention has been described with reference to particular means, materials and embodiments, the invention is not intended to be limited to the particulars disclosed; rather, the invention extends to all functionally equivalent structures, methods, and uses such as are within the scope of the appended claims.

What is claimed is:

1. A video game apparatus, which moves a character in a virtual three-dimensional space and performs perspective transformation on the character from a view point of a virtual camera onto a virtual screen, comprising:
a distance calculator that calculates a distance between a position in the virtual three-dimensional space of the character and a position of the view point of the virtual camera which is different from a position of any object existing in the virtual three-dimensional space;
a far distance determining section that determines whether the distance calculated by said distance calculator is longer than a predetermined critical far distance;
a view point mover that moves the position of the view point closer to the character when said far distance determining section determines that the calculated distance is longer than the critical far distance; and
a perspective transformation system that performs perspective transformation on the character in the virtual three-dimensional space from the view point of said virtual camera onto the virtual screen.

2. The video game apparatus according to claim 1, further comprising:
a near distance determining section that determines whether the distance calculated by said distance calculator is shorter than a predetermined critical near distance which is shorter than the critical far distance,
wherein said view point mover moves the position of the view point away from the character when said near distance determining section determines that the calculated distance is shorter than the critical near distance.

3. The video game apparatus according to claim 2, further comprising:
a character movement determining section that determines whether the character has moved beyond a predetermined range during a predetermined period,
wherein said view point mover moves the position of the view point such that the distance between the view point and the character reaches a predetermined distance that is longer than the critical near distance and shorter than the critical far distance when said character movement determining section determines that the character has not moved beyond the predetermined range.

4. The video game apparatus according to claim 1, wherein said view point mover moves the position of the view point at a velocity that is greater than a moving velocity of the character.

5. The video game apparatus according to claim 1, wherein said view point mover changes the moving velocity of the position of the view point in accordance with the moving velocity of the character.

6. The video game apparatus according to claim 1, wherein said view point mover moves the position of the view point while maintaining a range of a field of view of the virtual camera constant.

7. The video game apparatus according to claim 1, wherein an arbitrary number of reference points are assigned to the character, and said distance calculator obtains a distance between the position of the view point and the position of each reference point and calculates an average of the obtained distances as a distance between the position of the character and the position of the view point.

8. The video game apparatus according to claim 1, wherein an arbitrary number of reference points are assigned to the character, and said distance calculator obtains a distance between the position of the view point and the position of each reference point and calculates a shortest distance of all the obtained distances as the distance between the position of the character and the position of the view point.

9. The video game apparatus according to claim 1, wherein the character is a player character that moves in the virtual three-dimensional space according to an instruction from a player.

10. A video game apparatus, which moves a character in a virtual three-dimensional space and performs perspective transformation on the character from a view point of a virtual camera onto a virtual screen, comprising:
a distance calculator that calculates a distance between a position in the virtual three-dimensional space of the character and a position of the view point of the virtual camera which is different from a position of any object existing in the virtual three-dimensional space;
a near distance determining section that determines whether the distance calculated by said distance calculator is shorter than a predetermined critical near distance;
a view point mover that moves the position of the view point away from the character when said near distance determining section determines that the calculated distance is shorter than the critical near distance; and
a perspective transformation system that performs perspective transformation on the character in the virtual three-dimensional space from the view point of the virtual camera onto the virtual screen.

11. The video game apparatus according to claim 10, wherein said view point mover moves the position of the view point at a velocity that is greater than a moving velocity of the character.

12. The video game apparatus according to claim 10, wherein said view point mover changes the moving velocity of the position of the view point in accordance with the moving velocity of the character.

13. The video game apparatus according to claim 10, wherein said view point mover moves the position of the view point while maintaining a range of the field of view of the virtual camera constant.

14. The video game apparatus according to claim 10, wherein an arbitrary number of reference points are assigned to the character, and said distance calculator obtains a distance between the position of the view point and the position of each reference point and calculates an average of the obtained distances as the distance between the position of the character and the position of the view point.

15. The video game apparatus according to claim 10, wherein an arbitrary number of reference points are assigned to the character, and said distance calculator obtains a distance between the position of the view point and the position of each reference point and calculates a shortest distance of all the obtained distances as the distance between the position of the character and the position of the view point.

16. The video game apparatus according to claim 10, wherein said character is a player character that moves in the virtual three-dimensional space according to an instruction from a player.

17. A video game apparatus, which moves a character in a virtual three-dimensional space and performs perspective transformation on the character from a view point of a virtual camera onto a virtual screen, comprising:
   a distance calculator that calculates a distance between a position in the virtual three-dimensional space of the character and a position of the view point of said virtual camera which is different from a position of any object existing in the virtual three-dimensional space;
   a far distance determining section that determines whether the distance calculated by said distance calculator is longer than a predetermined critical far distance;
   a field of view changer that decreases a range of the field of view of the virtual camera when said far distance determining section determines that the calculated distance is longer than the critical far distance; and
   a perspective transformation system that performs perspective transformation on the character in the virtual three-dimensional space from the view point of the virtual camera onto the virtual screen.

18. The video game apparatus according to claim 17, further comprising:
   a near distance determining section that determines whether the distance calculated by said distance calculator is shorter than a predetermined critical near distance which is shorter than the critical far distance,
   wherein said field of view changer increases the range of the field of view of the virtual camera when said near distance determining section determines that the calculated distance is shorter than the critical near distance.

19. The video game apparatus according to claim 17, wherein said field of view changer changes the range of the field of view based on a relationship between the distance calculated by said distance calculator and a size of the character.

20. The video game apparatus according to claim 17, wherein an arbitrary number of reference points are assigned to the character, and said distance calculator obtains a distance between the position of the view point and the position of each reference point and calculates an average of the obtained distances as the distance between the position of the character and the position of the view point.

21. The video game apparatus according to claim 17, wherein an arbitrary number of reference points are assigned to the character, and said distance calculator obtains a distance between the position of the view point and the position of each reference point and calculates a shortest distance of all the obtained distances as the distance between the position of the character and the position of said view point.

22. The video game apparatus according to claim 17, wherein the character is a player character that moves in said virtual three-dimensional space according to an instruction from a player.

23. A video game apparatus, which moves a character in a virtual three-dimensional space and performs perspective transformation on the character from a view point of a virtual camera onto a virtual screen, comprising:
   a distance calculator that calculates a distance between a position in the virtual three-dimensional space of the character and a position of the view point of the virtual camera which is different from a position of any object existing in the virtual three-dimensional space;
   a near distance determining section that determines whether the distance calculated by said distance calculator is shorter than a predetermined critical near distance;
   a field of view changer that increases a range of the field of view of the virtual camera when said near distance determining section determines that the calculated distance is shorter than the critical near distance; and
   a perspective transformation system that performs perspective transformation on the character in the virtual three-dimensional space from the view point of the virtual camera onto the virtual screen.

24. The video game apparatus according to claim 23, wherein said field of view changer changes the range of the field of view based on a relationship between the distance calculated by said distance calculator and a size of the character.

25. The video game apparatus according to claim 23, wherein an arbitrary number of reference points are assigned to the character, and said distance calculator obtains a distance between the position of the view point and the position of each reference point and calculates an average of the obtained distances as the distance between the position of the character and the position of the view point.

26. The video game apparatus according to claim 23, wherein an arbitrary number of reference points are assigned to the character, and said distance calculator obtains a distance between the position of the view point and the position of each reference point and calculates a shortest distance of all the obtained distances as the distance between the position of the character and the position of the view point.

27. The video game apparatus according to claim 23, wherein said character is a player character that moves in the virtual three-dimensional space according to an instruction from a player.

28. A video game apparatus having a memory that stores a three-dimensional video game program and a processor that executes said program and causing a display device to display an image as a result of processing executed by said processor, said program stored in said memory and executed by said processor comprising:
   moving a character in a virtual three-dimensional space;
   calculating a distance between a position of the character in the virtual three-dimensional space and a position of a view point of a virtual camera which is different from a position of any object existing in the virtual three-dimensional space;
   determining whether the calculated distance is longer than a predetermined critical far distance;
   moving the position of the view point closer to the character when it is determined that the calculated distance is longer than the critical far distance; and
   performing perspective transformation on the character in the virtual three-dimensional space from the view point of the virtual camera onto a virtual screen.

29. A video game apparatus having a memory that stores a three-dimensional video game program and a processor that executes said program and causing a display device to display an image as a result of processing executed by said processor, said program stored in said memory and executed by said processor comprising:

moving a character in a virtual three-dimensional space;
calculating a distance between a position of the character in the virtual three-dimensional space and a position of a view point of a virtual camera which is different from a position of any object existing in the virtual three-dimensional space;
determining whether the calculated distance is shorter than a predetermined critical near distance;
moving the position of the view point away from the character when it is determined that the calculated distance is shorter than the critical near distance; and
performing perspective transformation on the character in the virtual three-dimensional space from the view point of the virtual camera onto a virtual screen.

30. A video game apparatus having a memory that stores a three-dimensional video game program and a processor that executes said program and causing a display device to display an image as a result of processing executed by said processor, said program stored in said memory and executed by said processor comprising:
moving a character in a virtual three-dimensional space;
calculating a distance between a position of the character in the virtual three-dimensional space and a position of a view point of a virtual camera which is different from a position of any object existing in the virtual three-dimensional space;
determining whether the calculated distance is longer than a predetermined critical far distance;
decreasing a range of the field of view of the virtual camera when it is determined that the distance is longer than the critical far distance; and
performing perspective transformation on the character in the virtual three-dimensional space from the view point of the virtual camera onto a virtual screen.

31. A video game apparatus having a memory that stores a three-dimensional video game program and a processor that executes said program and causing a display device to display an image as a result of processing executed by said processor, said program stored in said memory and executed by said processor comprising:
moving a character in a virtual three-dimensional space;
calculating a distance between a position of the character in the virtual three-dimensional space and a position of a view point of a virtual camera which is different from a position of any object existing in the virtual three-dimensional space;
determining whether the calculated distance is shorter than a predetermined critical near distance;
increasing a range of the field of view of the virtual camera when it is determined that the calculated distance is shorter than the critical near distance; and
performing perspective transformation on the character in the virtual three-dimensional space from the view point of the virtual camera onto a virtual screen.

32. A character display method in a three-dimensional video game that moves a character in a virtual three-dimensional space and performs perspective transformation on the character from a view point of a virtual camera onto a virtual screen to display on a display screen, comprising:
calculating a distance between a position of the character in the virtual three-dimensional space and a position of the view point of the virtual camera which is different from a position of any object existing in the virtual three-dimensional space;
determining whether the calculated distance is longer than a predetermined critical far distance; and
moving the position of the view point closer to the character when it is determined that the calculated distance is longer than the critical far distance.

33. The character display method according to claim 32, further comprising:
determining whether said calculated distance is shorter than a predetermined critical near distance which is shorter than the critical far distance; and
moving the position of the view point away from the character when it is determined that the calculated distance is shorter than the critical near distance.

34. The character display method according to claim 33, further comprising:
determining whether the character has moved beyond a predetermined range during a predetermined period after moving the view point; and
moving the position of the view point such that the distance between the position of the view point and the position of the character reaches a predetermined distance that is longer than the critical near distance and shorter than the critical far distance when it is determined that the character does not move beyond the predetermined range.

35. A character display method in a three-dimensional video game that moves a character in a virtual three-dimensional space and performs perspective transformation on the character from a view point of a virtual camera onto a virtual screen to display on a display screen, comprising:
calculating a distance between a position of the character moved in the virtual three-dimensional space and a position of the view point of the virtual camera which is different from a position of any object existing in the virtual three-dimensional space;
determining whether the calculated distance is shorter than a predetermined critical near distance; and
moving the position of the view point away from the character when it is determined that the calculated distance is shorter than the critical near distance.

36. A character display method in a three-dimensional video game that moves a character in a virtual three-dimensional space and performs perspective transformation on the character from a view point of a virtual camera onto a virtual screen to display on a display screen, comprising:
calculating a distance between a position of the character in the virtual three-dimensional space and a position of the view point of the virtual camera which is different from a position of any object existing in the virtual three-dimensional space;
determining whether the calculated distance is longer than a predetermined critical far distance; and
decreasing a range of the field of view of the virtual camera when it is determined that the calculated distance is longer than the critical far distance.

37. A character display method in a three-dimensional video game that moves a character in a virtual three-dimensional space and performs perspective transformation on the character from a view point of a virtual camera onto a virtual screen to display on a display screen, comprising:
calculating a distance between a position of the character in the virtual three-dimensional space and a position of the view point of the virtual camera which is different from a position of any object existing in the virtual three-dimensional space;
determining whether the calculated distance is shorter than a predetermined critical near distance; and increasing a range of the field of view of the virtual camera when it is determined that the calculated distance is shorter than the critical near distance.

38. A computer-readable storage medium on which a three-dimensional video game program is recorded, the program causing a computer to execute:
    moving a character in a virtual three-dimensional space;
    calculating a distance between a position of the character in the virtual three-dimensional space and a position of a view point of a virtual camera which is different from a position of any object existing in the virtual three-dimensional space;
    determining whether the calculated distance is longer than a predetermined critical far distance;
    moving the position of the view point closer to the character when it is determined that the calculated distance is longer than the critical far distance; and
    performing perspective transformation on the character in the virtual three-dimensional space from the view point of the virtual camera onto a virtual screen.

39. A computer-readable storage medium on which a three-dimensional video game program is recorded, the program causing a computer to execute:
    moving a character in a virtual three-dimensional space;
    calculating a distance between a position of the character in the virtual three-dimensional space and a position of a view point of a virtual camera which is different from a position of any object existing in the virtual three-dimensional space;
    determining whether the calculated distance is shorter than a predetermined critical near distance;
    moving the position of the view point away from the character when it is determined that the calculated distance is shorter than the critical near distance; and
    performing perspective transformation on the character in the virtual three-dimensional space from the view point of the virtual camera onto a virtual screen.

40. A computer-readable storage medium on which a three-dimensional video game program is recorded, the program causing a computer to execute:
    moving a character in a virtual three-dimensional space;
    calculating a distance between a position of the character in the virtual three-dimensional space and a position of a view point of a virtual camera which is different from a position of any object existing in the virtual three-dimensional space;
    determining whether the calculated distance is longer than a predetermined critical far distance;
    decreasing a range of the field of view of the virtual camera when it is determined that the distance is longer than the critical far distance; and
    performing perspective transformation on the character in the virtual three-dimensional space from the view point of the virtual camera onto a virtual screen.

41. A computer-readable storage medium on which a three-dimensional video game program is recorded, the program causing a computer to execute:
    moving a character in a virtual three-dimensional space;
    calculating a distance between a position of the character in the virtual three-dimensional space and a position of a view point of a virtual camera which is different from a position of any object existing in the virtual three-dimensional space;
    determining whether the calculated distance is shorter than a predetermined critical near distance;
    increasing a range of the field of view of the virtual camera when it is determined that the calculated distance is shorter than the critical near distance; and
    performing perspective transformation on the character in the virtual three-dimensional space from the view point of the virtual camera onto a virtual screen.

* * * * *

UNITED STATES PATENT AND TRADEMARK OFFICE
CERTIFICATE OF CORRECTION

| | |
|---|---|
| PATENT NO. | : 7,170,508 B2 |
| APPLICATION NO. | : 10/293360 |
| DATED | : January 30, 2007 |
| INVENTOR(S) | : Ohno et al. |

Page 1 of 1

It is certified that error appears in the above-identified patent and that said Letters Patent is hereby corrected as shown below:

On the title page, at item (73) Assignee, of the printed patent, "Kabushiki Kaisha Square Enix, Tokyo (JP)" should be --Kabushiki Kaisha Square Enix (also Trading as Square Enix Co., Ltd.), Tokyo (JP)--.

Signed and Sealed this

Twenty-seventh Day of May, 2008

JON W. DUDAS
*Director of the United States Patent and Trademark Office*